(12) United States Patent
Chen et al.

(10) Patent No.: US 10,349,313 B2
(45) Date of Patent: Jul. 9, 2019

(54) ENHANCED FEATURES FOR A GATEWAY COORDINATING MULTIPLE SMALL CELL RADIO ACCESS NETWORKS

(71) Applicant: Corning Optical Communications LLC, Hickory, NC (US)

(72) Inventors: Tsung-Yi Chen, San Jose, CA (US); Jaspreet Singh, San Jose, CA (US); Peter J. Worters, San Carlos, CA (US)

(73) Assignee: Corning Optical Communications LLC, Hickory, NC (US)

( * ) Notice: Subject to any disclaimer, the term of this patent is extended or adjusted under 35 U.S.C. 154(b) by 306 days.

(21) Appl. No.: 15/081,311

(22) Filed: Mar. 25, 2016

(65) Prior Publication Data

US 2016/0262063 A1 Sep. 8, 2016

Related U.S. Application Data

(63) Continuation-in-part of application No. 15/059,235, filed on Mar. 2, 2016.

(60) Provisional application No. 62/127,004, filed on Mar. 2, 2015, provisional application No. 62/137,932, filed on Mar. 25, 2015, provisional application No. 62/137,942, filed on Mar. 25, 2015, provisional application No. 62/137,947, filed on Mar. 25, 2015, provisional application No. 62/137,925, filed on Mar. 25, 2015, provisional application No. 62/137,905, filed on Mar. 25, 2015, provisional application No. 62/137,913, filed on Mar. 25, 2015.

(51) Int. Cl.
*H04W 36/00* (2009.01)
*H04W 4/02* (2018.01)
*H04W 76/19* (2018.01)
*H04W 88/16* (2009.01)

(52) U.S. Cl.
CPC ....... *H04W 36/0022* (2013.01); *H04W 4/025* (2013.01); *H04W 36/0055* (2013.01); *H04W 76/19* (2018.02); *H04W 88/16* (2013.01)

(58) Field of Classification Search
None
See application file for complete search history.

(56) References Cited

U.S. PATENT DOCUMENTS

| | | | |
|---|---|---|---|
| 8,982,841 | B2 | 3/2015 | Srinivasan |
| 9,521,539 | B2 | 12/2016 | Gorey et al. |
| 9,936,363 | B2 | 4/2018 | Diamond et al. |
| 9,948,548 | B2 | 4/2018 | Gandhi |
| 10,111,144 | B2 | 10/2018 | Suarez |

(Continued)

OTHER PUBLICATIONS

International Preliminary Report on Patentability for PCT/US2016/022372, dated Sep. 21, 2017, 10 pages.

(Continued)

*Primary Examiner* — Jamaal Henson
(74) *Attorney, Agent, or Firm* — C. Keith Montgomery

(57) ABSTRACT

A method of coordinating a plurality of radio access networks (RANs) includes aggregating, with a gateway, communications interfaces between a plurality of RANs and a packet core network through the gateway. A plurality of radio nodes (RNs) in each of the RANs is communicatively coupled to the gateway and to user equipment (UE) devices associated with the RNs in each of the RANs. The gateway also controls and coordinates mobility of the UE devices within and among the RANs.

80 Claims, 12 Drawing Sheets

(56) References Cited

U.S. PATENT DOCUMENTS

| | | | |
|---|---|---|---|
| 10,194,480 B2 | 1/2019 | Gandhi | |
| 10,206,157 B2 | 2/2019 | Lubenski et al. | |
| 10,212,631 B2 | 2/2019 | Ling et al. | |
| 2005/0207408 A1* | 9/2005 | Elliott | H04L 69/04 370/389 |
| 2007/0291836 A1* | 12/2007 | Shi | H04N 21/234381 375/240.01 |
| 2009/0310584 A1 | 12/2009 | Viorel et al. | |
| 2010/0167730 A1 | 7/2010 | Shin | |
| 2010/0315974 A1 | 12/2010 | Richardson et al. | |
| 2011/0096714 A1 | 4/2011 | French et al. | |
| 2011/0244866 A1 | 10/2011 | Yamamoto et al. | |
| 2012/0071168 A1* | 3/2012 | Tomici | H04W 40/04 455/445 |
| 2012/0208579 A1 | 8/2012 | Persson et al. | |
| 2013/0018978 A1* | 1/2013 | Crowe | H04L 67/2842 709/214 |
| 2013/0143541 A1 | 6/2013 | Henderson et al. | |
| 2013/0272132 A1 | 10/2013 | Heo et al. | |
| 2013/0294403 A1 | 11/2013 | Srinivasan | |
| 2013/0337832 A1 | 12/2013 | Park et al. | |
| 2014/0036816 A1 | 2/2014 | Madan et al. | |
| 2014/0092730 A1* | 4/2014 | Yang | H04W 28/0226 370/229 |
| 2014/0095325 A1* | 4/2014 | Kim | G06Q 30/0275 705/14.71 |
| 2014/0269502 A1 | 9/2014 | Forenza et al. | |
| 2014/0376374 A1 | 12/2014 | Moser et al. | |
| 2015/0031354 A1 | 1/2015 | Nuss et al. | |
| 2015/0043390 A1 | 2/2015 | Wang et al. | |
| 2015/0173011 A1 | 6/2015 | Das et al. | |
| 2015/0295807 A1* | 10/2015 | Huang | H04L 43/062 709/224 |
| 2016/0062758 A1 | 3/2016 | Narayanan et al. | |
| 2016/0095012 A1 | 3/2016 | Laukkanen | |
| 2016/0112945 A1 | 4/2016 | Chen et al. | |
| 2016/0262038 A1 | 9/2016 | Dunn et al. | |
| 2016/0262063 A1 | 9/2016 | Chen et al. | |
| 2016/0262069 A1 | 9/2016 | Parsay et al. | |
| 2016/0269954 A1 | 9/2016 | Purohit | |
| 2016/0270132 A1 | 9/2016 | Patil et al. | |
| 2017/0311217 A1 | 10/2017 | Jung et al. | |

OTHER PUBLICATIONS

International Search Report and Written Opinion for PCT/US2016/022372, dated Aug. 30, 2016, 13 pages.
Non-Final Office Action for U.S. Appl. No. 15/059,235, dated Oct. 19, 2017, 18 pages.
Final Office Action for U.S. Appl. No. 15/059,235, dated Mar. 21, 2018, 20 pages.
Advisory Action for U.S. Appl. No. 15/059,235, dated May 30, 2018, 3 pages.
Examiner's Answer to the Appeal Brief for U.S. Appl. No. 15/059,235, dated Dec. 10, 2018, 13 pages.
Extended European Search Report for European Patent Application No. 16762711.6, dated Jan. 18, 2019, 9 pages.
Non-Final Office Action for U.S. Appl. No. 15/069,781, dated Feb. 14, 2018, 28 pages.
Non-Final Office Action for U.S. Appl. No. 15/069,220, dated Dec. 15, 2017, 16 pages.
EP16762711.6 Partial Search Report Completed Oct. 2, 2018, European Patent Office, 7 Pgs.

\* cited by examiner

ENHANCED FEATURES FOR A GATEWAY COORDINATING MULTIPLE SMALL CELL RADIO ACCESS NETWORKS

CROSS-REFERENCE TO RELATED APPLICATIONS

This application is a continuation-in-part of U.S. Ser. No. 15/059,235 filed Mar. 2, 2016, entitled "GATEWAY COORDINATING MULTIPLE SMALL CELL RADIO ACCESS NETWORKS', which claims benefit and priority to U.S. Provisional Ser. No. 62/127,004, filed Mar. 2, 2015, entitled "Virtualized Gateway Coordinating Multiple Small Cell Radio Access Networks". This application also claims benefit and priority to U.S. Provisional Ser. No. 62/137,932, filed Mar. 25, 2015, entitled, "Content Caching in a Virtualized Gateway Coordinating Multiple Small Cell Radio Access Networks", U.S. Provisional Ser. No. 62/137,942 filed Mar. 25, 2015, entitled, "Backhaul Traffic Compression in a Virtualized Gateway Coordinating Multiple Small Cell Radio Access Network", U.S. Provisional Ser. No. 62/137,947, filed Mar. 25, 2015, entitled, "Over the Air Diagnostics In a Small Cell Radio Access Networks", U.S. Provisional Ser. No. 62/137,925, filed Mar. 25, 2015, entitled, "Hierarchical Data Mining Approach for Latent E-RAN Anomaly Detection".

BACKGROUND

Operators of mobile systems, such as Universal Mobile Telecommunications Systems (UMTS) and its offspring including LTE (Long Term Evolution) and LTE-Advanced, are increasingly relying on wireless small cell radio access networks (RANs) in order to deploy indoor (as well as dense outdoor) voice and data services to enterprises and other customers. Such small cell RANs typically utilize multiple-access technologies capable of supporting communications with multiple users using radio frequency (RF) signals and sharing available system resources such as bandwidth and transmit power.

One type of RAN architecture that is currently deployed includes a network of radio nodes connected to a centralized access controller or aggregation node. One example of such a controller or node is the Services Node available from Spidercloud, Wireless Inc. The centralized Services Node provides a number of advantages that help meet stringent key performance indicator (KPI) requirements. It also has dedicated hardware that is used to provide frequency synchronization between radio nodes in order to facilitate UMTS and LTE airlink performance.

SUMMARY

In accordance with one aspect of the subject matter described herein, a method of coordinating a plurality of radio access networks (RANs) includes aggregating, with a gateway, communications interfaces between a plurality of RANs and a packet core network through the gateway. A plurality of radio nodes (RNs) in each of the RANs is communicatively coupled to the gateway and to user equipment (UE) devices associated with the RNs in each of the RANs. The gateway also controls and coordinates mobility of the UE devices within and among the RANs.

In another aspect, caching may be used to reduce the load on the backhaul links between the RNs and the gateway and for reducing latency in data transmission on the downlink. That is, some of the downlink data is locally stored in the gateway or at the RNs, bypassing the need to communicate with the core network whenever a copy of a portion of the stored data is requested by a UE.

In another aspect, compression techniques may be employed on traffic traversing the backhaul links in order to reduce redundancy in the traffic. For instance, compression may be performed on the header information contained on packets traversing different modules within the gateway and on packets traveling between the gateway and a cluster of RNs. The payloads contained in the packets may also be compressed when, for instance, data being transmitted to different UEs is correlated. This may occur, for instance, at a sports or concert venue, where multiple UEs are transmitting the same audio and/or video stream.

In yet another aspect, a hierarchical data mining architecture may be employed to detect system anomalies such as a malfunctioning cell or to detect other events. The data mining technique may operate at three different levels: the RN cluster level, an access controller level and at a centralized level within the gateway. Each level may include its own anomaly detection method(s), each with different levels of detection granularity and different anomaly classes.

In accordance with another aspect of the subject matter described herein, a gateway through which a plurality of RANs communicate with a packet core network includes a plurality of access controller modules to which as least one RAN is assigned, a core network aggregator module, a mobility anchor module and a cluster manager module. Each of the access controller modules is configured to control the respective RAN assigned thereto. The core network aggregator module is configured as a single interface for all communication between the plurality of access controller modules and the packet core network. All data plane traffic between UEs attached to one of the RANs and the packet core network terminates at the mobility anchor module. The cluster manager module assigns RNs to the access controller modules and transfers RN assignments from one access controller module to a different access controller module under specified circumstances.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
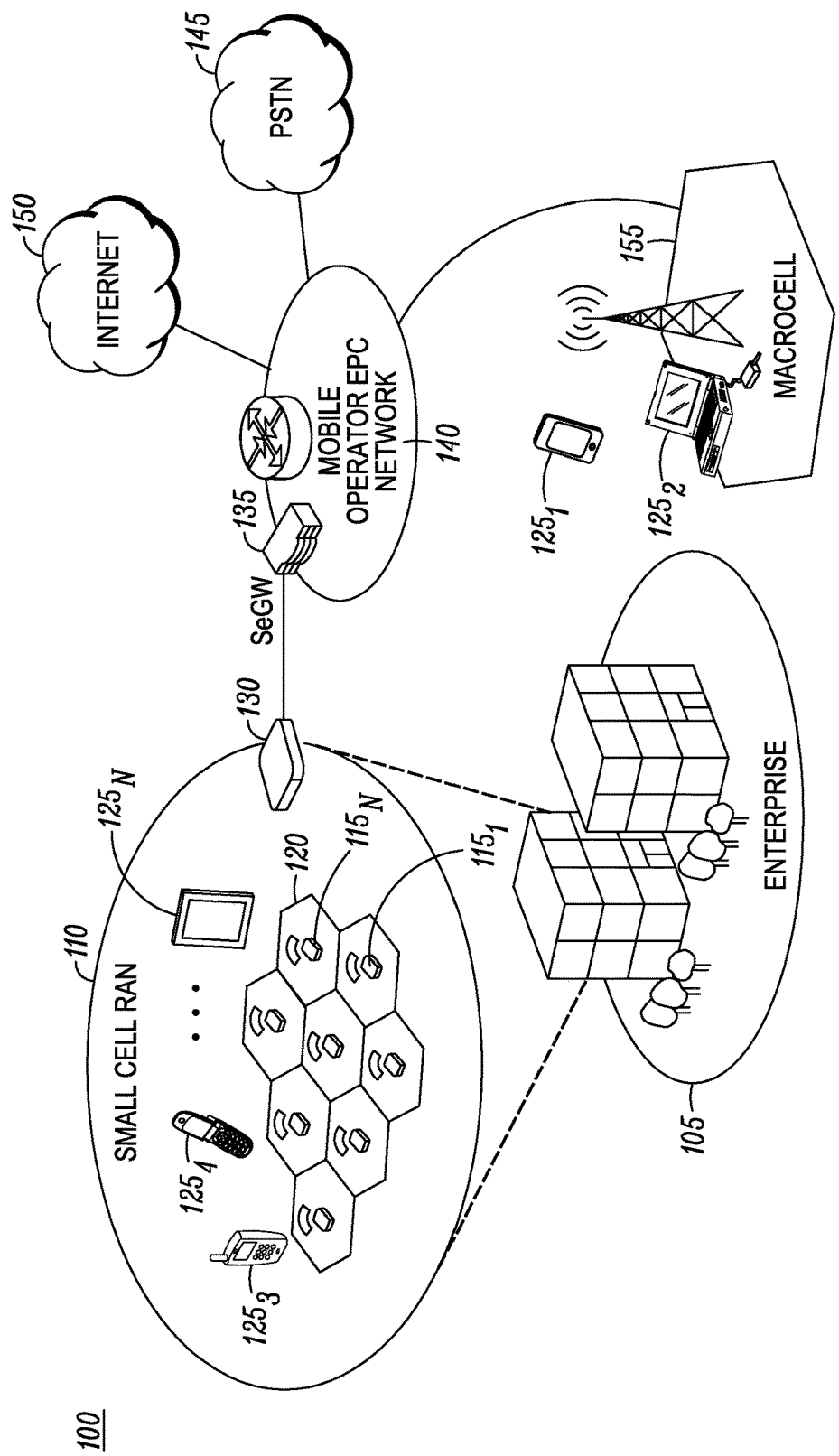
FIG. 1 shows a known mobile telecommunications environment that includes an enterprise in which a small cell RAN is implemented.

In the following description, numerous specific details are set forth in order to provide a thorough understanding of exemplary embodiments or other examples described herein. However, it will be understood that these embodiments and examples may be practiced without the specific details. In other instances, well-known methods and procedures have not been described in detail, so as not to obscure the following description. Further, the embodiments disclosed are for exemplary purposes only and other embodiments may be employed in lieu of, or in combination with, the embodiments disclosed.

Reference throughout this specification to "one embodiment", "an embodiment", "one example", "an example", "one implementation", "an implementation", and so on, means that a particular feature, structure or characteristic described in connection with the embodiment, example or implementation is included in at least one embodiment of the present invention. Thus, appearances of the aforementioned phrases and similar phrases in various places throughout this specification are not necessarily all referring to the same embodiment, example or implementation. Furthermore, the particular features, structures or characteristics may be combined in any suitable combinations and/or subcombinations in one or more embodiments, examples or implementations. In addition, it is appreciated that the figures provided herewith are for explanation purposes to persons ordinarily skilled in the art and that the drawings are not necessarily drawn to scale.

Overview

A centralized access controller or aggregation node may be implemented as an enterprise premise-based controller element that coordinates a group of radio nodes (RNs). In an LTE embodiment, the access controller functions as a local, premise-based gateway that anchors and aggregates a group of LTE RNs. As previously mentioned, one particular example of such an access controller is the Spidercloud Services Node. Details concerning the Spidercloud Services Node may be found in U.S. Pat. No. 8,982,841, which is hereby incorporated by reference in its entirety.

The use of the Spidercloud Services Node achieves a number of advantages. For instance, by presenting a services node and an entire group of RNs controlled by the SN as a single virtual evolved Node B (eNB) to the core network, the complexity associated with aggregating and controlling a large number of RNs (performed by the services node) is hidden from the Evolved Packet Core (EPC). Hiding such complexity is particularly important as the number of small cells is likely to significantly exceed the number of LTE macrocellular eNB's, which drives the dimensioning of EPC equipment pools. Second, mobility between the individual RNs controlled by an SN is completely handled at a local enterprise gateway level, thus significantly reducing mobility-related signaling from impacting the MME pool in the EPC.

While the advantages of having a centralized access controller or aggregation node such as the Spidercloud Services Node have proven to be important, it is generally only well-suited for certain types of deployment. At the low end of the pyramid, deployments that require only a handful of radio nodes do not justify the additional cost incurred by installing a services node in the enterprise. At the high end of the pyramid, deployments that require thousands of radio nodes cannot be serviced because of scaling limitations in the current E-RAN software. However, as the number of small cells increases exponentially in the future, it may be advantageous to provide a scalable solution to deploy and manage those small cell systems with reduced capital and operating expenses.

To address this problem, an E-RAN gateway architecture is shown herein which can be scaled to support all sizes of deployments, either within the enterprise, inside the operator's network, or in the cloud.

Moreover, virtualization is seen as an important trend in the telecommunications industry with large mobile operators committing to transform network functions running on dedicated and proprietary hardware to commercial off the shelf equipment running virtualized network functions. Accordingly, in some implementations the gateway architecture described herein may reside on a virtual machine platform, thus eliminating the need for specialized hardware.

Operating Environment

FIG. 1 shows a known mobile telecommunications environment 100 that includes an enterprise 105 in which a small cell RAN 110 is implemented. The small cell RAN 110 includes a plurality of radio nodes (RNs) 115$_1$ . . . 115N. Each radio node 115 has a radio coverage area (graphically depicted in the drawings as hexagonal in shape) that is commonly termed a small cell. A small cell may also be referred to as a femtocell, or using terminology defined by 3GPP as a Home Evolved Node B (HeNB). In the description that follows, the term "cell" typically means the combination of a radio node and its radio coverage area unless otherwise indicated. A representative cell is indicated by reference numeral 120 in FIG. 1.

The size of the enterprise 105 and the number of cells deployed in the small cell RAN 110 may vary. In typical implementations, the enterprise 105 can be from 50,000 to 500,000 square feet and encompass multiple floors and the small cell RAN 110 may support hundreds to thousands of users using mobile communication platforms such as mobile phones, smartphones, tablet computing devices, and the like (referred to as "user equipment" (UE) and indicated by reference numerals 125$_1$-125N in FIG. 1).

The small cell RAN 110 includes an access controller 130 that manages and controls the radio nodes 115. The radio nodes 115 are coupled to the access controller 130 over a direct or local area network (LAN) connection (not shown in FIG. 1) typically using secure IPsec tunnels. The access controller 130 aggregates voice and data traffic from the radio nodes 115 and provides connectivity over an IPsec tunnel to a security gateway SeGW 135 in an Evolved Packet Core (EPC) 140 network of a mobile operator. The EPC 140 is typically configured to communicate with a public switched telephone network (PSTN) 145 to carry circuit-switched traffic, as well as for communicating with an external packet-switched network such as the Internet 150.

The environment 100 also generally includes Evolved Node B (eNB) base stations, or "macrocells", as representatively indicated by reference numeral 155 in FIG. 1. The radio coverage area of the macrocell 155 is typically much larger than that of a small cell where the extent of coverage often depends on the base station configuration and surrounding geography. Thus, a given UE 125 may achieve connectivity to the network 140 through either a macrocell or small cell in the environment 100.

Figure 2:
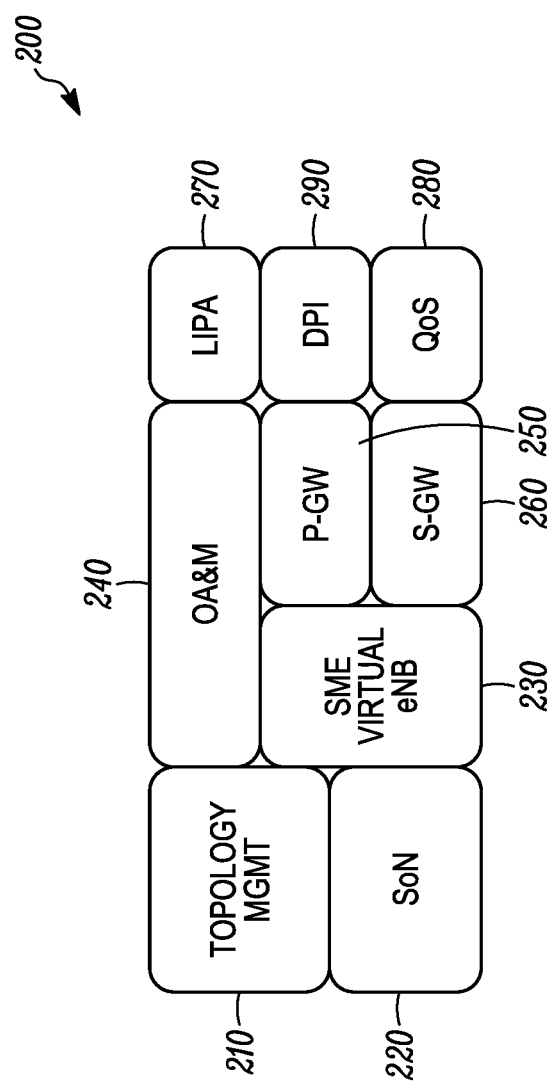
FIG. 2 shows a functional block diagram of one example of an access controller such as the Spidercloud Services Node.

As previously mentioned, the access controller shown above may be the Spidercloud Services Node, available from Spidercloud Wireless, Inc. FIG. 2 shows a functional block diagram of one example of an access controller 200 such as the Spidercloud services node. The access controller may include topology management 210, self-organizing network (SON) 220, a services node mobility entity (SME) 230, an operation, administration, and management (OAM) module 240, a PDN GW/PGW module 250, a SGW module 260, a local IP access (LIPA) module 270, a QoS module 280, and a deep packet inspection (DPI) module 290. Alternative embodiments may employ more or less functionality/modules as necessitated by the particular scenario and/or architectural requirements.

Cloud-Based Gateway

As mentioned above, an access controller is generally suitable for a small cell RAN 110 that includes anywhere from several (e.g., 8) cells 120 up to about 100 or so cells 120. RANs that include fewer than several cells 120 are typically too small to make the cost of the access controller economical. Likewise, RANs that include more than about 100 cells can be difficult to coordinate with a single access controller.

One way to address those environments in which the use of an access controller is impractical, either because it includes too few or too many cells, is to move the functionality of the access controller from the enterprise 105 to a cloud-based gateway that may be located, for example, in the mobile operator's core network. Alternatively, the cloud-based gateway may be located elsewhere and operated by a third party (e.g., an entity other than the mobile operator or the enterprise).

Figure 3:
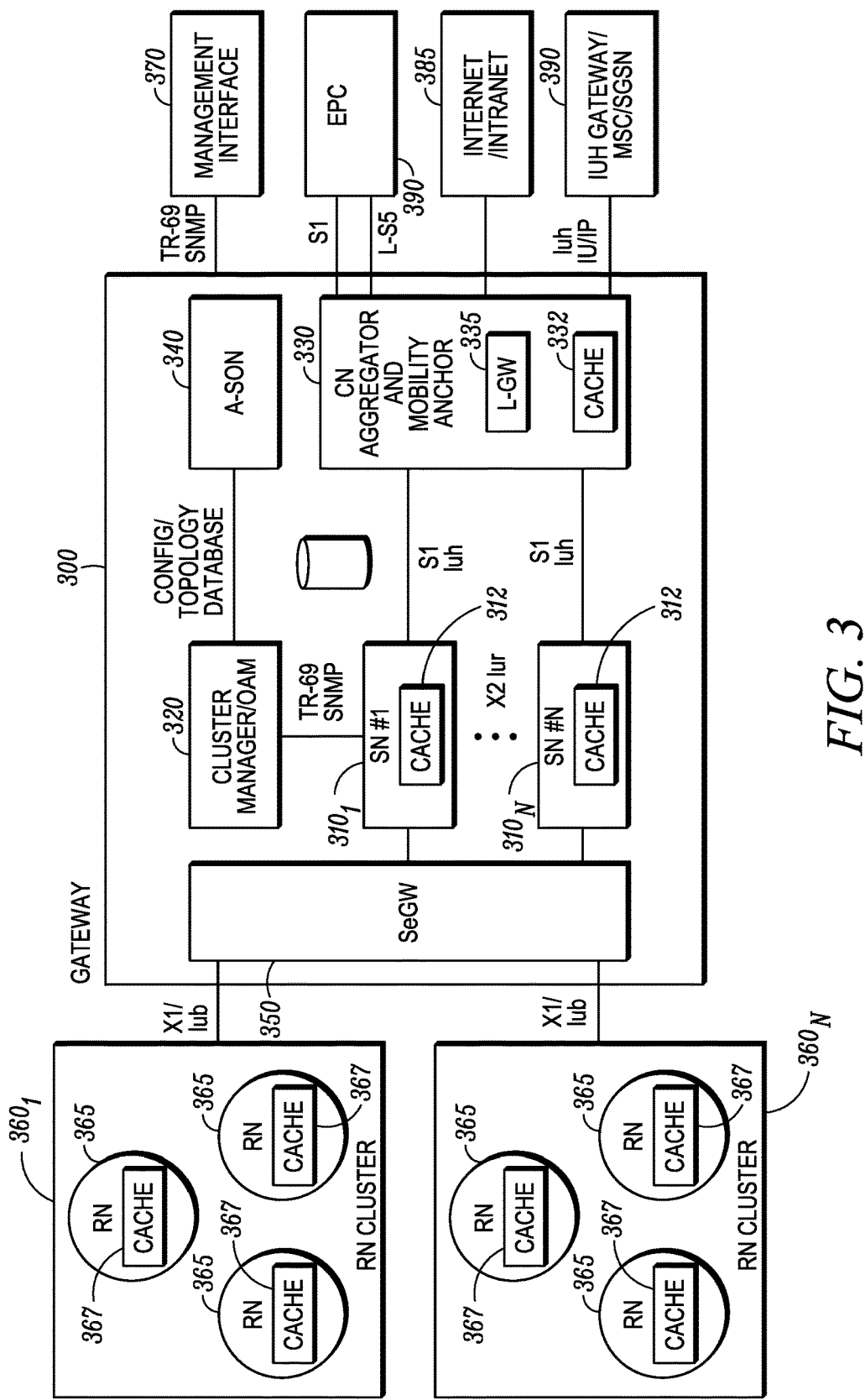
FIG. 3 shows a functional block diagram of one example of a gateway that operates between a series of RANs and a core networks.

FIG. 3 shows a functional block diagram of one example of a gateway 300 of the type described above. The gateway 300 includes multiple instances of a services node (SN) $310_1, 310_2 \ldots 310_n$ ("310"), cluster manager and operations/administration module (OAM) 320, an aggregated SON (A-SON) module 340 and a core network (CN) aggregator and mobility anchor 330. It should be appreciated that the gateway 300 shown in FIG. 3 is only one example of such a gateway and that it may have more or fewer components than shown, may combine two or more components, or it may have a different configuration or arrangement of components. In some implementations the components of the gateway 300 may be run as a virtual application residing on a virtual machine platform. In this way the software will be agnostic to the underlying hardware provided that a virtual machine layer lies between them. More generally, however, the various components shown in FIG. 3 may be implemented in hardware, software or a combination of both hardware and software. Additionally, in some cases the gateway 300 may also be practiced in a distributed computing environments where certain tasks are performed by remote processing devices that are linked through a communications network.

If the components of the gateway 300 are run as a virtual application, then in some implementations the gateway 300 may employ a Network Function Virtualization (NFV) architecture. NFV refers to an architecture for telecommunication services as published by the European Telecommunications Standards Institute (ETSI) in a series of documents available from the ETSI website (See Network Functions Virtualization (NFV); Infrastructure Overview, ETSI GS NFV-INF 001 V1.1.1 (January 2015), http://www.etsi.org/deliver/etsi_gs/NFV-INF/001.sub.--099/001/01.01.01.sub.--60/gs_NFV-INF001v010101p.pdf). NFV uses a generic hardware platform and software adapted for the generic hardware platform. Thus, NFV creates a network that can be more flexible and dynamic than a legacy communication network. In NFV-based networks, a Virtual Network Function (VNF) decouples the software implementation of the network function from the infrastructure resources it runs on by virtualization. A network service is based on one or more VNFs and/or Physical Network Functions (PNFs), their interconnections, and chaining definitions. The VNFs can be executed on a wide variety of generic hardware processing platforms (e.g., x86 based hardware). Therefore, VNFs may be installed, removed, and moved between hardware facilities much more easily, less costly and thus, more frequently.

Referring again to FIG. 3, each instance of the services node 310 provides the functionality of an access controller of the type described above and serves a single small cell RAN, which is shown as a radio node (RN) cluster. For example, as shown, SN $310_1$ serves RN cluster $360_1$ and SN $310_N$ serves RN cluster $360_N$, both via the optional security gateway 350. The RNs in the clusters may communicate with the security gateway 350 over a proprietary X1/Iub' connection. The SNs 310 may communicate with one another over conventional protocols using, for example, X2/Iur connections. The remaining gateway components shown in FIG. 2 allow the aggregation of the services nodes 310 and provide intra-small cell coordination such as UE handovers between the nodes and coordination of the d-SON functionality provided by each individual services node 310.

Thus, each instance of the SN 310 acts as a serving controller to one or more RN clusters and each SN 310 acts as a control point for all radio nodes in the radio node cluster. As the number of RN clusters increase, new instances of the SN 310 can be created to meet the requirements. While in principle there is no limit on the number of SN instances that are allowed, in practice it will depend on constraints such as CPU, memory, networking interfaces and so on. Each SN is responsible for 3G and LTE Radio Resource Management (RRM) of all the RN clusters to which it is connected and admission control of RRC Connections. In addition, the SN is responsible for coordinating RF parameters using Localized SON (e.g., d-SON) and for coordinating the mobility of RNs within or between clusters. Since the architecture of each SN supports centralized layer L3 (RRC/RRM) processing, it is able to provide a wide variety of features. For instance, each SN can provide centralized admission control that enables the SN to re-direct low priority users to other cells. In addition, each SN can provide fast handovers since they are completely hidden from the EPC. The SNs can also perform LTE RRC Reestablishment procedures across cells and RANs and, furthermore, they can support soft handovers in UMTS. The SNs can also optimize LTE call setup times by combining and/or piggybacking multiple control plane messages between a radio node and a SN, which is required in high latency backhaul networks.

As previously mentioned, the SNs 310 may communicate with one another over conventional protocols using, for example, X2/Iur connections. Communication between the SNs 310 and the cluster manager/OAM 320 may also employ conventional protocols such as SNMP/TR-069. Likewise, the SNs 310 and the CN aggregator/mobility anchor 330 may employ conventional protocols such as Iuh (for UMTS) and S1 (for LTE over SCTP/IP). Of course, alternative protocols may be employed instead, including both standard and proprietary protocols.

Figure 4A:
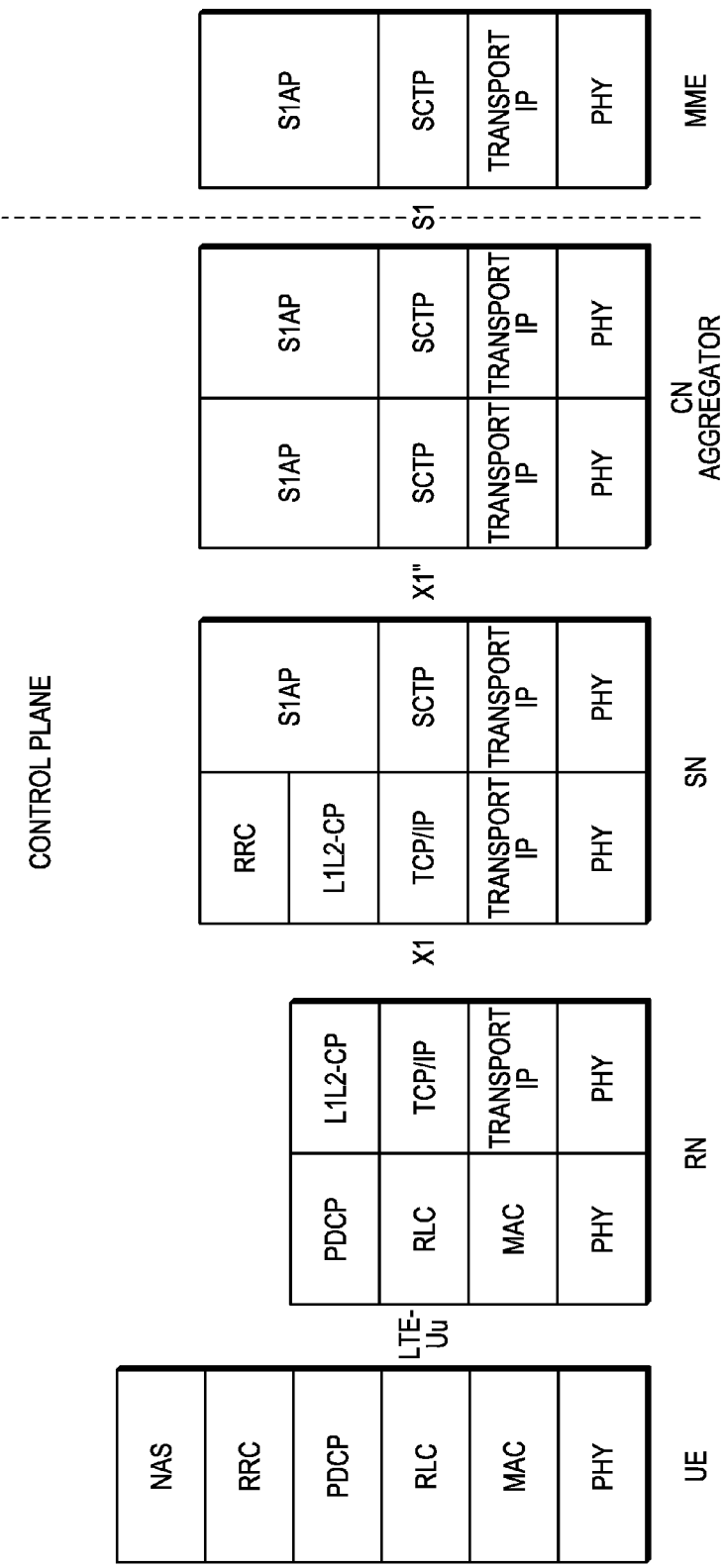
FIGS. 4A and 4B shows one example of a protocol stack that may be employed for the control plane and the user plane, respectively, in an environment that includes the gateway of FIG. 3 in terms of the OSI (Open Systems Interconnection) model of logical layers.
Figure 4B:
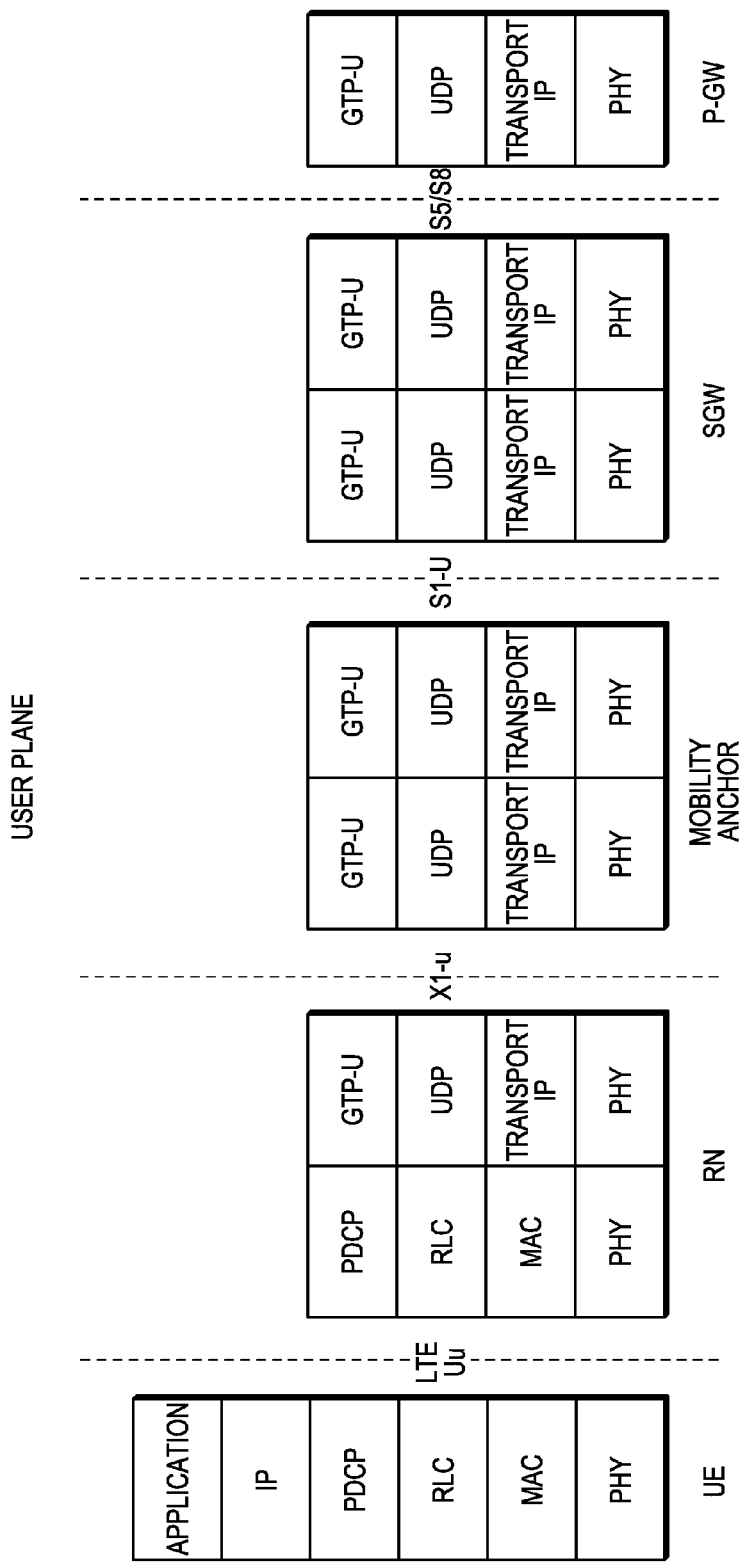

FIGS. 4A and 4B shows one example of a protocol stack that may be employed for the control plane and the user plane, respectively, in an environment that includes the gateway of FIG. 3 in terms of the OSI (Open Systems Interconnection) model of logical layers. As is known in the art, the Non-Access Stratum (NAS) layer protocol is responsible for signaling and traffic between UE and the network for control purposes such as network attach, authentication, setting up of bearers, and mobility management. The S1 Application Protocol Layer (S1AP) supports the various functions of the S1 interface. The Stream Control Transmission Protocol (SCTP) is a transport protocol for exchanging data that provides a reliable transport service over IP and operates at the equivalent level of UDP and TCP. The Radio Resource Control (RRC) protocol is responsible for control plane signaling between a UE and the network, i.e. such tasks as broadcast of system information; establishment, maintenance and release of RRC connection; establishment, configuration, maintenance and release of signaling and data radio bearers; security functions including key management; mobility functions such as control of UE cell selection/reselection; paging; UE measurement configuration, processing and reporting; handover; quality of service (QoS) management functions; UE measurement reporting and control of the reporting, but not exclusively. The Packet Data Control Protocol (PDCP) layer is responsible for (de-)compressing the headers of user plane IP packets. The Radio Link Control (RLC) layer is used to format and transport traffic and a Medium Access Control (MAC) layer provides addressing and channel access control mechanisms. The physical (PHY) layer, translates logical communication requests into hardware-specific operations such as modulation, bit synchronization, multiplexing, equalization, forward error correction etc.

Protocol layers that may be employed in the control plane between the mobility anchor and the RNs and between the mobility anchor and the SGW in the core network may include a Transport Internet Protocol (IP) layer, a user datagram protocol (UDP) and a GPRS Tunneling Protocol-User plane (GTP-U) for creating IP-based tunnels. It should be noted that the X1, X1" and X1-u interfaces shown in FIG. 4 may be proprietary. The remaining interfaces may all be standard 3GPP interfaces.

In some embodiments each of the SNs may perform logical open systems interconnection (OSI) layer L3 processing. In some cases the SNs may also perform at least a portion of logical OSI layer L2 processing such as Packet Data Control Protocol (PDCP) processing, for example.

The cluster manager and operations/administration module (OAM) 320 shown in FIG. 3 provides a single provisioning point for the RN clusters. Among other things, the Cluster Manager/OAM provides authentication of radio nodes/clusters, self-discovery/radio node join procedures and software license management. The cluster manager/OAM module 320 also manages SN start-up and stop, redirects newly joining radio nodes to a particular RN cluster and redirects RNs to a specific SN instance. These tasks can be performed using topology discovery information obtained by the A-SON module 340 and the session load on the SN. In the event of a hardware or software failure within the gateway 300, the cluster manager/OAM module 320 can redirect RN clusters to new SN instances. The cluster manager/OAM module 320 may communicate with the SNs using any of a variety of protocols such as the Broadband Forum Technical Report 069 (TR-69) protocol, the Simple Network Management Protocol (SNMP), and the like.

In one implementation, the self-discovery/radio node join procedure may proceed as follows. A radio node is pre-provisioned with the fully qualified domain name (FQDN) of the gateway 300. When an RN boots up, it performs a Domain Name System (DNS) resolution process to obtain the IP address of the gateway 300. The RN then sends a Join Request message to the gateway 300 requesting a software image download from the cluster manager/OAM module 320. The cluster manager/OAM module 320 authenticates the RN and sends a Join Accept message upon successful authentication. The Join Accept message contains the SN information that is going to serve this RN such as an identifier and IP address of the SN to which it is to connect and any necessary software needed to establish that connection. The cluster manager/OAM module 320 selects the SN instance that is to serve this particular RN based on a variety of factors ("signatures") that may include, without limitation, the geographic location of the RN (e.g., GPS coordinates, physical address, RF topology, IP address), the results of the topology discovery process performed by the A-SON module 340 and load balancing considerations based on the current load of the SNs.

The cluster manager/OAM module 320 can initiate the launch of a new SN instance when needed. For instance, in the event of an unrecoverable failure at a SN, the cluster manager/OAM module 320 can redirect a cluster to a different SN instance or launch a new SN instance. Based on the current load, the cluster manager/OAM module 320 can offload some of the SNs and change the cluster configuration. The cluster manager/OAM module 320 can also support additional features such as location locking. For example, an RN may be factory-provisioned so that it is only operable at a fixed location.

The core network (CN) aggregator and mobility anchor module 330 shown in FIG. 3 acts as the interface between the gateway 300 and the core network. The CN aggregator in the CN aggregator and mobility anchor module 330 takes the individual SN connections and combines them into a single connection that is directed to the Evolved Packet Core (EPC) 380 of the mobile operator. That is, the CN aggregator aggregates the core facing interfaces of the SNs to a single interface towards the EPC 380. It also provides a single Iuh connection between the SNs and the core network, specifically the mobile switching center (MSC) 390 for circuit-switched calls and the serving GPRS support node (SGSN) 390 for packet-switched calls. In particular, for UMTS networks the CN aggregator connects to a Home Node B Gateway (HNBGW) using Iuh/SCTP protocols. It can also connect to a pool of LTE MMEs using S1AP/SCTP protocols by providing one S1AP/SCTP connection to each MME. The MMEs to which it connects may belong to a single operator or multiple operators. The CN aggregator can connect to each individual SN using an S1AP/SCTP interface for LTE and an Iuh/SCTP interface for UMTS. The CN aggregator can also support Iu-Flex and S1-flex features and provide optimization for local area code (LAC)/routing area code (RAC) and tracking area code (TAC) planning and for paging.

The mobility anchor in the CN aggregator and mobility anchor module 330 hides from the core network all mobility events between the RN clusters and mobility events between SNs. All data plane traffic for LTE and UMTS terminate at the mobility anchor. The mobility anchor also provides soft handover functionality between RN clusters and manages PSC/PCI hand-in disambiguation across RN clusters when UEs move from the macro network to the small cell network and need to be assigned to an RN cluster. The mobility anchor can also provide GTP anchoring between the RNs and the EPC.

As noted above, the individual SNs each include Self-Organizing Network (SON) functionality, which facilitates automation of self-configuration, self-management, self-optimization and self-healing of the individual RN clusters. SON is an automation technology designed to make the planning, configuration, management, optimization and healing of mobile radio access networks simpler and faster. SON functionality and behavior has been defined and specified in generally accepted mobile industry recommendations produced by organizations such as 3GPP (3rd Generation Partnership Project) and the NGMN (Next Generation Mobile Networks). SON features are available for both LTE and UMTS. Typically, each SN 310 operates in a distributed SON (d-SON) architecture mode. Thus, the SN 310 configures and optimizes the cluster with which it is associated. When a new RN is added, it discovers the SN. From that point on, the SN takes responsibility for providing the RN with its software image and radio configuration. If an RN inside the cluster drops off the network, the SN servicing it adjusts the configuration of neighboring RNs to fill the coverage hole.

The A-SON module 340 shown in FIG. 3 is used to coordinate the actions of the various d-SON elements in each of the SNs 310 using a hierarchical structure to ensure that there is seamless SON functionality across the SNs. Using only limited topology information, the A-SON module 340 can group RNs into RN clusters and identify which clusters can undergo distributed SON simultaneously. In particular, the A-SON module 340 can solve a number of problems related to the discovery and management of the network topology for clusters of small cells. The problems that are addressed include: (1) how to accurately build network topology information for the boundary cells of each cluster, which see not only overlay macro cells but also boundary cells of other clusters that are deployed in the proximity and (2) how to update the network topology when some cells change their configurable parameters.

The A-SON module 340 can perform a variety of tasks. For instance, it can allocate physical cell identifiers (PCI) and primary scrambling codes (PSC) and their reuse across RN clusters associated with different SNs. The A-SON module 340 can also dynamically allocate transmit power assignments of radio nodes, perform closed loop monitoring of inter-SN mobility KPIs, dynamically update the neighbor topology and the neighbor tables maintained by the SNs and detect RF coverage overlaps and holes between cells. Mobility Robustness Optimization (MRO) and Mobility Load Balancing (MLB) may also be performed by the A-SON module 340.

The individual d-SON elements in the RN clusters cooperate with the A-SON module 340 to perform a number of tasks, including coordinating the SON configurations as received from A-SON module 340, providing periodic measurements and KPIs to the A-SON module, and dynamic fractional frequency reuse (FFR) assignments within the SNs, which may be based, for example, on the number of cell edge users and cell center users in the RNs served by the respective SNs at any given time. The d-SON elements also perform over the air frequency and phase synchronization of the RNs with other RNs and macro cells, when possible.

As further shown in FIG. 3, a management interface 370 to the gateway 300 may be provided which allows network operators to manage multiple small cell systems. The management interface is a centralized configuration, fault, and performance management system. Communication between the management interface 370 and the gateway 300 may be accomplished using, for example, a TR-69 or SNMP connection.

In some implementations the gateway 300 may operate as a multimode gateway supporting two or more bands. For example, one band may operate in accordance with LTE standards and the other may operate in accordance with UMTS standards. Accordingly, the gateway 300 can support clusters in which independent LTE and UMTS small cells are co-located, each being served by a dual or multi-mode RN.

A multimode gateway may be employed in a variety of different circumstances. For instance, a network operator may deploy the system and reserve one of the bands for themselves and lease the other band to another network operator. Alternatively, a third party may own and deploy the multimode network. In either case, each network operator wants to use their own core network. In such a case the CN aggregator may have multiple S1 connections to the different core networks of the operators. Additionally, each dual (or multi) mode RN may have two (or multi) dedicated proprietary X1 connections to the SNs, each representing a different operator. From the operators' perspective, there appears to be a SN and a set of RNs dedicated to each operator, although the different SNs may reside on a common hardware platform. To provide this capability the SNs are provided with functionality that allows each operator to configure their cells independently of the other.

In some cases the multimode gateway can facilitate cooperation among the different network operators. The different operators would be aware of the shared resources (e.g., RNs and all or various subcomponents of a SN) and would allow information to be shared between them in order to allow joint optimization of the coverage and capacity for UEs supported by the different operators.

Figure 5:
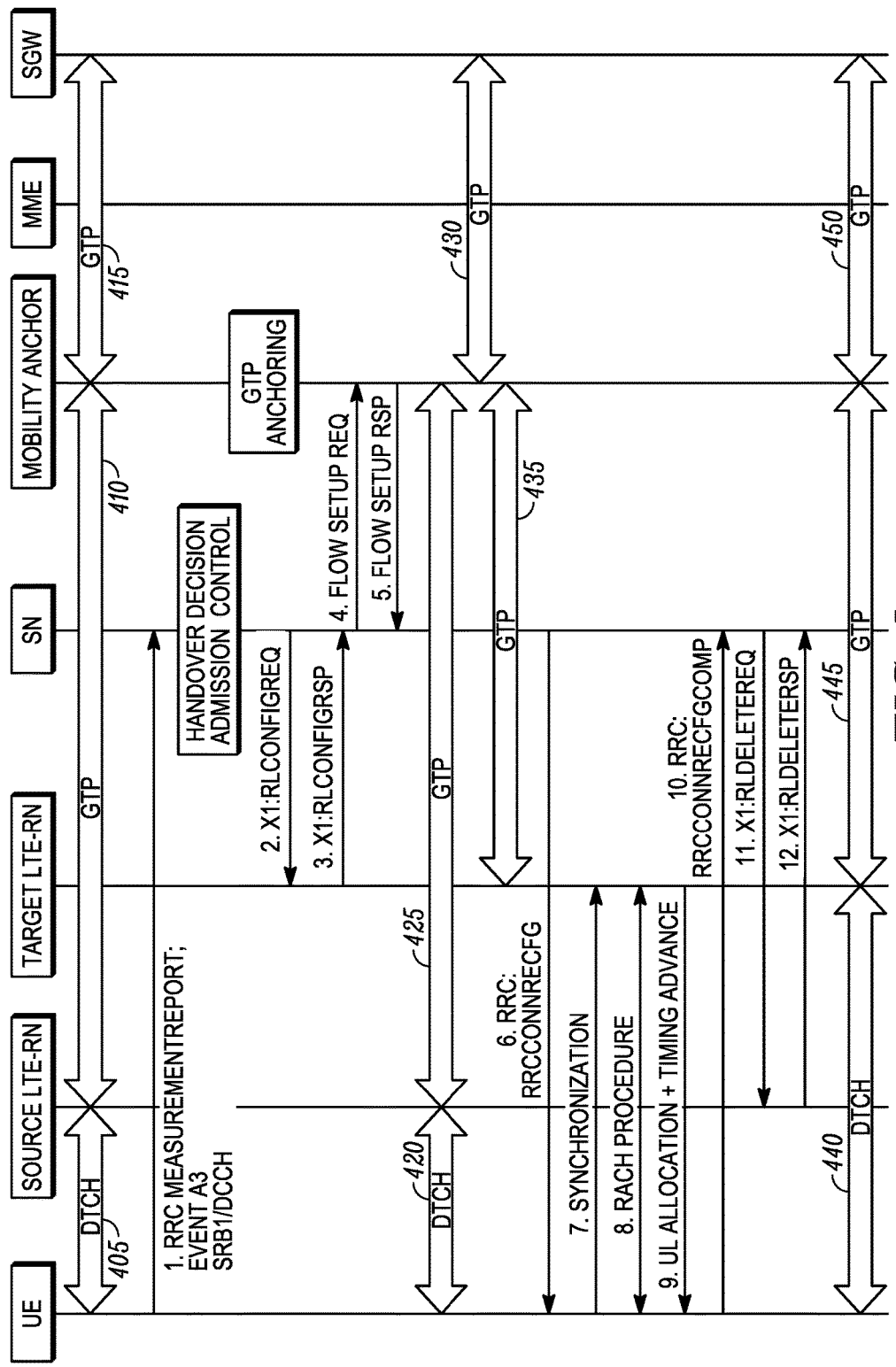
FIG. 5 shows a message flow diagram of an LTE intra-SN handover in which a UE connected to a source RN is handed-over by the gateway shown in FIG. 3 to a new RN (the target RN).

FIG. 5 shows a message flow diagram of an LTE intra-SN handover in which a UE connected to a source RN is handed-over by the gateway to a new RN (the target RN). Initially, the UE is connected to the source RN over a logical dedicated transport channel (DTCH), indicated by arrow 405, which is used to carry all traffic between a UE and an RN. The source RN, in turn, uses the GPRS tunneling protocol (GTP), indicated by arrow 410, to carry uplink user traffic and transport it from the Source RN to the mobility anchor in the CN aggregator and mobility anchor. Likewise, the mobility anchor, which aggregates all GTP traffic received from, and destined for, the various RNs, forwards the uplink user traffic, indicated by arrow 415, to the SGW in the core network using GTP. Similarly, downlink user traffic is received by the mobility anchor from the SGW and establishes a new GTP tunnel over which the traffic is forwarded to the source RN, which in turn forwards the traffic to the UE over the DTCH.

With continuing reference to FIG. 5, the source RN receives at 1 a Radio Resource Control (RRC) measurement report. There are multiple measurement report triggering events defined for an LTE cellular network. When the criteria or conditions defined for a triggering event are satisfied, the UE will generate and send a measurement report to its serving cell RN. In this case the UE sends a measurement report upon the occurrence of an A3 event, which indicates that the UE is receiving a stronger signal from a neighboring cell than the current serving cell. That is, in this case the RRC measurement report indicates that the UE is receiving a stronger signal from the target RN than the source RN. The source RN forwards the RRC measurement report to the SN with which it is associated.

Based on the measurement report, the SN decides to perform a handover from the source RN to the target RN. In this example both the source and target RNs are associated with the same SN instance. In response, at 2, the SN uses the UE context information to set up a radio link between the SN and target RN using the X1 interface by sending a radio link configuration request. At 3, the target RN responds with a radio link configuration response. In this way the target RN is prepared by the SN for the handover of the UE. After the target RN has been prepared, the SN sends a flow setup request at 4 to the mobility anchor. In this way the SN interacts with the mobility anchor to establish a new GTP tunnel between the target RN and mobility anchor. The mobility anchor responds with a flow setup response at 5.

At this point all GTP information has been exchanged that is needed to set up a tunnel between the mobility anchor and the target RN, but no traffic is being communicated on that tunnel yet. That is, as indicated by arrows 420, 425 and 430, all user traffic is still going through the source RN. Next, as indicated by arrow 435, GTP traffic also starts flowing from the mobility anchor to the target RN as well as source RN. Subsequently, the mobility anchor stops sending GTP traffic to the source RN. Thus, all downlink data destined for the UE now comes from the SGW to the mobility anchor, and then to the target RN, which at this point is simply buffering the traffic. All uplink traffic, however, is still going through the source RN, to the mobility anchor and then to the SGW.

Next, at 6 the SN sends a RRC connect reconfiguration request to the UE instructing it to switch to the target RN. At 7-9, a conventional exchange of messages occurs between the UE and the target RN to synchronize the UE and the target RN. For instance, the UE undergoes at 8 a Random Access Channel (RACH) procedure over a logical RACH channel in order to attach to the target RN. Likewise, at 9 the target RN responds with the UL allocation and timing advance information.

At this point the UE is now synchronized with the target RN and at 10 the UE sends a RRC connection reconfiguration complete message to the SN. From a layer 3 signaling point of view, the handover is now complete. Finally, at 11 the SN uses the X1 interface to send a radio link delete request to the source RN and at 12 the source RN acknowledges by sending the SN a radio link delete response. The target RN now sends the buffered user traffic to UE over the DTCH, as indicated by arrow 440. Accordingly, uplink and downlink traffic can now be communicated between the UE and target RN using DTCH and between the target RN and mobility anchor using GTP (arrow 445), as well as between the mobility anchor and the SGW using GTP (arrow 450).

As the message flow chart in FIG. 5 illustrates, an intra-SN UE handover can be performed in a manner that is transparent to the core network since all mobility-related messages terminate at the mobility anchor.

Figure 6:
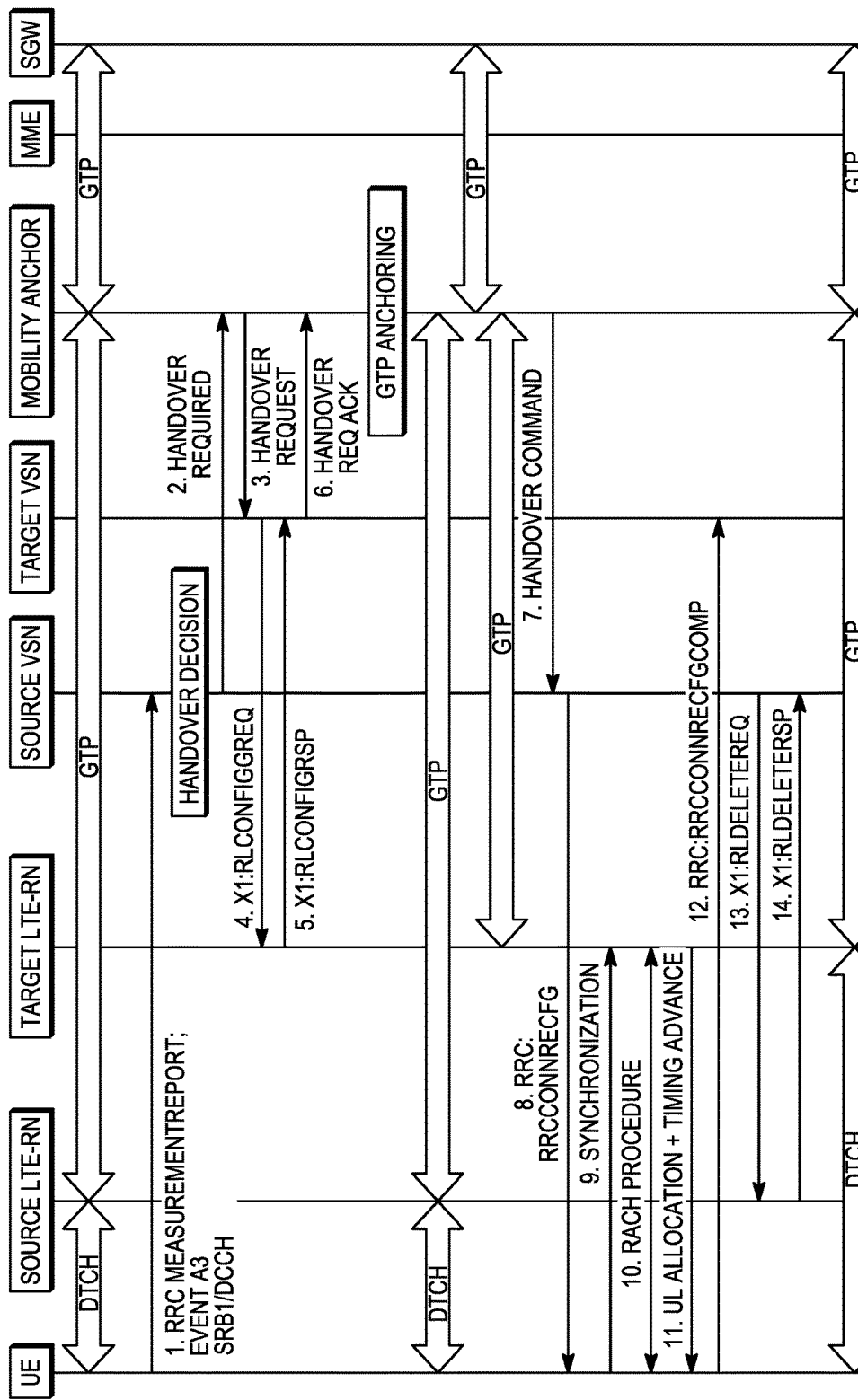
FIG. 6 shows a message flow diagram of an LTE inter-SN handover in which a UE connected to a source RN associated with one SN instance is handed-over to a new RN (the target RN) that is associated with a different SN instance in the gateway of FIG. 3.

Similar to FIG. 5, FIG. 6 shows a message flow diagram of an LTE inter-SN handover in which a UE connected to a source RN associated with one SN instance is handed-over to a new RN (the target RN) that is associated with a different SN instance in the gateway.

The primary difference between the messages that are exchanged in the inter-SN handover of FIG. 5 compared to the intra-SN handover of FIG. 6 is that in FIG. 6 the layer 3 context is moved from one SN instance to another SN instance. This occurs when the source SN determines that the target RN is associated with a different SN. Unlike in FIG. 5, this transfer between SN instances requires communication between the source and target SN instances via the mobility anchor.

In the following only those messages that are different from those shown in FIG. 5 are discussed. As in FIG. 5, the UE is initially attached to the source RN, which is associated with the source SN.

As shown in FIG. 6, after the source SN decides to perform a handover from the source RN to the target RN, the source RN sends a handover request at 2 to the mobility anchor. In response, at 3 the mobility anchor sends a handover request to the target SN, identifying to it the source SN, the source RN, and the UE. When the target SN receives the handover request at 3, it prepares the radio link as it did before at 4-5. After the radio link has been successfully configured, at 6 the target SN acknowledges the handover by sending handover request acknowledgement to the mobility anchor, indicating that it is ready for UE attachment. The mobility anchor then sets up a GTP tunnel between it and the target RN. At 7 the mobility anchor sends a handover command to the source SN indicating that the request has been fulfilled. As before, the source SN sends the UE at 8 an RRC connect reconfiguration, which contains the information it needs concerning the target RN. The remaining synchronization and other message exchanges proceed as in FIG. 5.

Content Caching

Small cell RANs of the type described above can dramatically improve the coverage in and capacity of mobile wireless communication systems. The large number of small cell RNs that are to be deployed to achieve these gains, however, also presents significant challenges. One challenge pertains to the significantly increased capacity of the "backhaul" links that would be required to connect the small cell RNs with the carrier's core network, making the backhaul a bottleneck. This leads to a further problem of increased latency in data transmission.

In accordance with various embodiments of the systems and techniques described herein, methods based on content caching are presented. These methods are described in the context of a scalable small cell system based on a gateway of the type described above.

As discussed above, each RN cluster 360 may include upwards of several hundreds of RNs 365, with each RN 365 serving several tens of UEs in a connected state at a given time. Consequently, the backhaul link carrying traffic between an RN 365 in cluster 360 and the SN 310 serving the RN cluster 360 in the cloud potentially becomes a bottleneck. Similarly, the backhaul link between an SN 310 and the CN aggregator and mobility anchor module 330 is another potential bottleneck. Reducing the load on each of these backhaul links can therefore enhance system performance. It should be noted in a traditional LTE network architecture, the packet core communicates directly with an RN 365 since there is no use of a services node or a RN cluster 360. As a consequence the backhaul bottleneck and latency issues considered in the present circumstances are markedly distinct from issues that are faced in traditional architectures.

In various embodiments caching is used to reduce the load on the backhaul links and for reducing latency in data transmission on the downlink. The basic idea behind caching is to locally store some of the downlink data, bypassing the need to communicate with the core network whenever a copy of a portion of the stored data is requested by a UE. In the architecture depicted in FIG. 3 caching of downlink data may be implemented at any or all of the three levels in the hierarchy: Caching at a radio node 365, caching at an SN 310 and caching at the CN aggregator and mobility anchor module 330. As shown in FIG. 3, the RNs 365 each includes cache 367, the SNs 310 each include cache 312 and the CN aggregator and mobility anchor module 330 includes cache 332. The RNs 365 will generally have a constant resource available for caching. However, in those embodiments in which the SNs run as virtualized functions, the SNs can dynamically adjust the resource used for caching. The retrieval of data cached at any of these levels can save bandwidth on the backhaul links, bypassing the need to retrieve the data from the core network.

The type of data or content that is to be cached at each level may be determined in a variety of different ways and may be application specific based on any of a number of factors such as the nature of the enterprise, for instance. Regardless of the content to be cached, the close proximity of the RN 365 to the end user (UE) would provide low latency transmission of the content cached at the RN 365. Consequently, content that is most likely to be requested for transmission generally may be cached at the RN 365. Following similar logic, an SN 310 may cache content that is less likely to be retrieved compared to the content cached at a RN 365, but more likely to be retrieved compared to the content cached at the CN aggregator and mobility anchor module 330. A formal procedure for determining the type of content to be cached at each level may include rating some or all content items that has been requested in the (recent) history, and assigning an importance metric to each item. Depending on the amount of cache storage available at an RN 365, the most important content can be cached at the RN 365, followed by the caching at an SN 310 and then at the CN aggregator and mobility anchor module 330. Of course, in order to determine the type of content for rating purposes, the gateway needs to be able to actively inspect the packet headers to identify, for instance, the file type for caching purposes. This is only possible for those network connections that are unsecured (e.g., connections that do not employ HTTS). For unsecured connections, the SNs, the CN aggregator and mobility anchor module and the RNs themselves will generally be able to inspect the packet headers to determine whether the content should be cached.

In the preceding embodiment, recently requested content items may be rated independently for the different RNs within a cluster 360. In this scenario, each RN 365 would cache the highest rated content at the RN 365, while the next highest rated content from all the RNs would be commonly cached at the SN, followed by caching at the CN aggregator and mobility anchor module. In another case, the rating of the recently requested content items may be rated in a combined manner across the different RNs. This could be facilitated, for instance, by the SN, which would possess information regarding all the content recently transmitted by the various RNs. In this case, a common set of content may be cached at the different RNs, depending on storage availability. In the presence of a master-RN (M-RN), which can communicate with all other RNs within a cluster 360, a common cache may be maintained at the M-RN as well. The M-RN can thereby provide quick access to data requests from any of the other RNs in the cluster.

In another embodiment, a method may be employed to predict the appropriate content to cache for a particular small cell RAN deployment based on factors such as the time of day, geographic area, and other features unique to the particular deployment. For example, daily financial news could be cached in the morning for a small cell RAN deployed on Wall Street. In some implementations the prediction method may run on a SN instance inside of the virtualized gateway.

In some embodiments the gateway can provide real-time traffic insights, including the bandwidth required to deliver the traffic, to major content providers. The caching resources described herein can then be used to provide a service to those content providers, who can use the resources to cache their content to ensure that it is delivered with reduced delays. The caching resources can be priced in a variety of ways. For instance, each caching resource can be priced according to the response time for delivering content to the UEs and the size of the cache. In this way, in some implementations, a real-time or near real-time auction system can be built to provide non-discriminatory caching services to content providers. Content providers can then bid on the resources based on their own need (e.g., a major software release, movie release, etc).

In some embodiments traffic offload technologies may be employed in addition to or instead of content caching to reduce backhaul bottleneck. For instance, Local IP Access (LIPA) and/or Selected Internet IP Traffic Offload (SIPTO) techniques, which are available for both LTE and 3GPP networks, may be employed. Both techniques allow some traffic to avoid traversing the core network. In particular LIPA allows UEs connected to a local IP access network to access other IP capable entities on the same network without the need for traversing the core network. LIPA may be particularly advantageous when employed in conjunction with local caching. In particular, when end to end security is employed so that inspection of the packet headers is not possible, content caching and LIPA can both be used.

LIPA can be implemented by providing the gateway 300 with a Local Gateway (L-GW). The L-GW may reside at various places in the gateway. For instance, as shown in FIG. 3, L-GW 335 may be incorporated into the CN aggregator and mobility anchor 330. As another alternative, a L-GW may be co-located, for instance, with each of the SNs. Depending on the location and configuration of the L-GW (s), a UE may only be able to access other IP capable entities within the same RN cell. Alternatively, in other embodiments the L-GW(s) may be configured so that a UE can also access entities that are in the same RN cluster, or even across RNs in different clusters. As indicated in FIG. 3, the L-GW may communicate with the core network (e.g., the S-GW) using an L-S5 interface, which is based on the GTP protocol.

SIPTO allows a UE connected to a local access network to access an IP network (i.e., the Internet) without traversing the core network.

Hierarchical Data Mining for Detection of Anomalies, Operating Environment, and Other Events Dense small cell deployments create an opportunity to efficiently detect cellular network anomalies, identify the deployed small cells' operating environment automatically, and detect many other events. One important class of detection problems that arises in cellular networks of all types is latent anomalies, also known as the sleeping cell problem, which are often hidden from network operators. A sleeping cell, or more precisely the RN in the cell, may be visible to UEs in the cell because it is radiating the expected pilot signal but the sleeping cell may not be receiving the expected number of access requests, terminations, registrations, and/or traffic. In another case, the sleeping cell may not even be radiating and so may be invisible to UEs in the cell. Since UEs cannot see the sleeping cell, this cell may also be receiving a smaller than expected number of access requests, terminations, registrations, and/or traffic. Sleeping cells may result from hardware, firmware, and/or software problems in the base station.

Anomalies such as sleeping cells and the like may be caused, for instance, by subtle faults in an RN that cannot be readily observed using the various Key Performance Indicators (KPIs) that are reflective of the RAN's reliability and stability. That is, average values of the KPIs may appear normal, yet one or more faults may nevertheless exist.

Latent anomalies can be detrimental since a UE's quality of service (QoS) may degrade significantly when it is under the coverage of a malfunctioning cell, yet the operator may not be able to observe the system anomaly via periodic KPI updates within a reasonable period of time. This problem may be exacerbated in large-scale small cell deployments since they potentially consist of thousands of RNs and many more links.

Various data mining techniques have been demonstrated to be effective to detect anomalies in large systems, which perform complex functions. Real time monitoring of a rich dataset from dense small cells wireless networks can be valuable in detecting network anomalies, which might otherwise be unnoticed using regular KPI tracking. However, aggregating all the available datasets from each SN in the virtualized gateway imposes a significant demand on the network capacity as well as the data processing capability.

The mobile telecommunications environment 100 described above can be used to perform data mining in a distributed and hierarchical manner so that these problems are ameliorated by reducing data traffic and computational complexity. In particular, in one aspect of the invention, a hierarchical data mining architecture is employed to limit the data transfer demands between and among RN clusters, SNs, and the CN aggregator, while providing robust anomaly detection of the small cell RANs.

In one implementation, the hierarchical data mining architecture may operate at three different levels: the RN cluster level, the SN level and at a centralized level (e.g., at the cluster manager 320, the A-SON module 340, the CN aggregator and mobility anchor 330 or other centralized module communicating with the SNs 310 that aggregates data from all the SNs in the virtualized gateway. Each level may include its own anomaly detection method(s), each with different levels of detection granularity and different anomaly classes. For instance, at the RN cluster level, hardware anomalies, local network anomalies, and air interface anomalies may be detected. On the other hand, at the SN level various types of wide area network anomalies may be detected. The anomaly detectors at each level may use a locally stored dataset to provide an estimation of the anomaly. For example, the output from a first level of detection could simply be positive (potential anomaly) or negative (normal). That is, it generally will not be necessary to record all the fine grain information that is available at one level in the hierarchy and pass it up to the next level in the hierarchy.

If, however, one level of anomaly detection detects a potential anomaly (e.g., an RN at the cluster level is found to be potentially in a fault state), it could start to pass up more information than it otherwise would to the next higher level in the hierarchy. In this way the higher level has more information available for analysis when a fault is suspected. In some cases the lower level may decide on its own that there is a potential fault and that more information should be passed to the next higher level. In other cases, however, the higher level may request additional data from a lower level if it suspects an anomaly. The detection algorithm(s) that is employed at the lower levels preferably should keep the false-positive probability fixed at a reasonably low number while minimizing the false negative probability.

The CN aggregator can make a request to download and forward the full information to the management interface 370 (see FIG. 3) when necessary, e.g., when a majority of SNs are reporting a "potential anomaly". A fine grain data analysis can then be performed off-line, outside of the virtualized gateway, to confirm the anomaly and identify the specific problem.

The input data that is employed in the hierarchical data mining architecture described herein may be any suitable data that can be made available by or through the RNs. Illustrative examples of such input data include, without limitation, key performance indicators (KPIs), radio frequency (RF) signatures (e.g., path losses, signal strength), timing events, channel quality indicator (CQI) feedback, positioning reference signal (PRS) reports, and so on.

When an anomalous event or a specific event of interest to the network operator occurs, a number of different input variables may take on values that collectively define a pattern that can be examined by the system operator. System operators may therefor look for similar patterns in the future in order to identify anomalous events. In some cases the system operator may predefine a default set of events and their corresponding patterns of input values. Likewise, machine learning techniques and other learning functions may be used to identify patterns that arise when an event occurs. Examples of learning functions that may be employed include, without limitation, logical regression functions, feed-forward/recurrent artificial neural networks, k-mean clustering and so on. The following description focuses on the example of anomaly detection, but the techniques can generally be applied to general event detection and environment identification.

When any of these default patterns or learned patterns is found to arise in a system, the operator can be notified that an anomalous event may be occurring and that suitable action should be taken. Learning function modules may be provided at any or all levels in the network, including the RN cluster level, the SN level and the centralized level.

Figure 7:
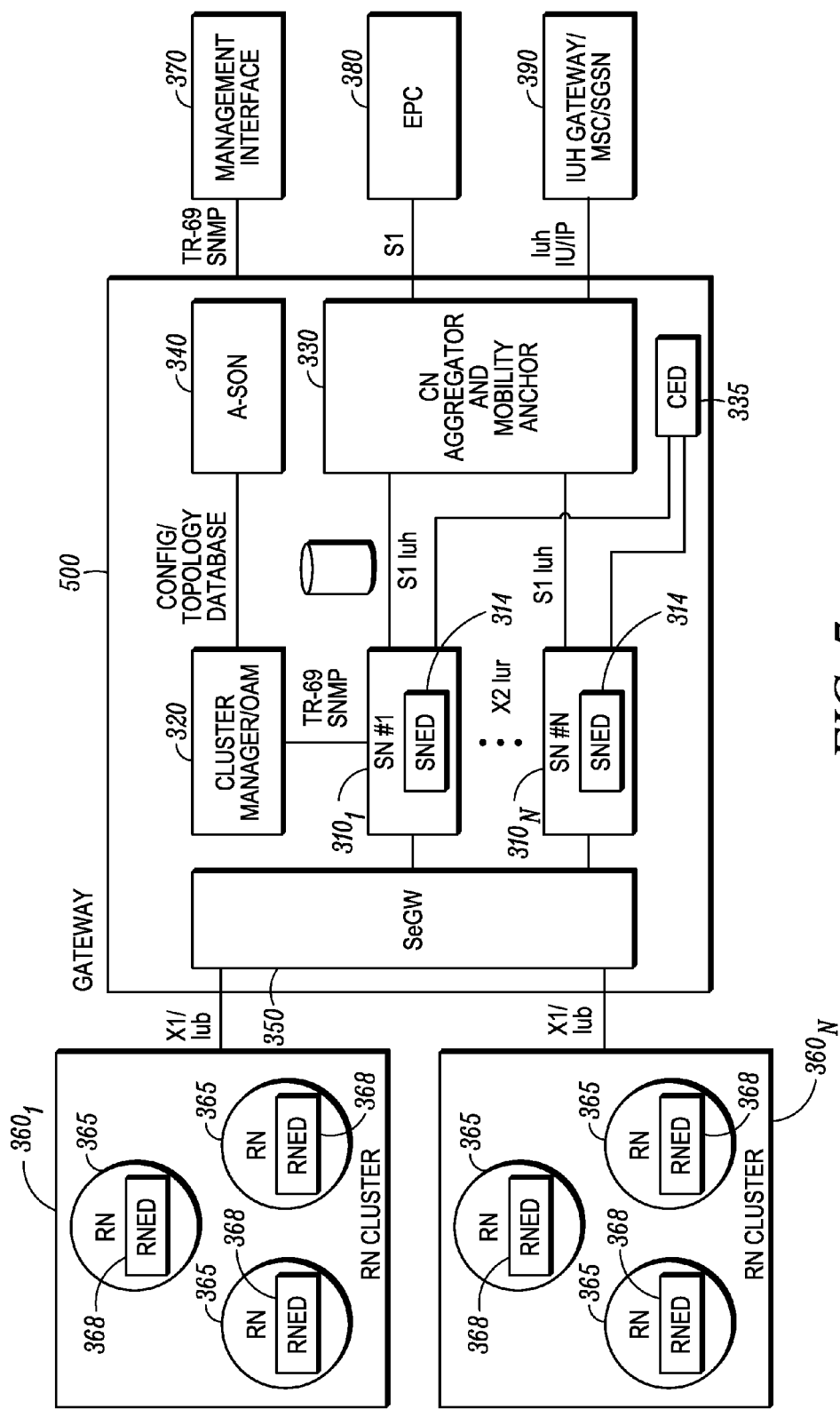
FIG. 7 shows a functional block diagram of another example of a gateway similar to the gateway shown in FIG. 3, except that that in FIG. 7 event monitors are shown at each level of the hierarchy for providing multi-level event detection.

FIG. 7 shows a functional block diagram of another example of a gateway 500 similar to the gateway 300 shown in FIG. 3, except that that in FIG. 7 event monitors are shown at each level of the hierarchy for providing multi-level event detection. In FIGS. 3 and 7 like elements are denoted by like reference numerals. As shown, each of the RNs includes an RN event detector (RNED) 368 and each of the SNs 310 includes an SN event detector (SNED) 314. Likewise, the gateway 500 also includes a centralized event detector (CED) 335 that communicates with each of the SNs 310. Communication among the event detectors may be part of the standard fault, configuration, accounting, performance, security (FCAPS) management frameworks. While CED 335 is illustratively shown as an independent functional module in the gateway 500, more generally its functionality may be alternatively, or additionally, distributed among other modules included in or associated with the gateway 500. For instance, if some of the input data received from the SNEDs 314 concerns the operation of the d-SONS elements in the SNs 310, then some of the functionality of the CED 335 may be incorporated into the A-SON module 340.

Each detector can use the dataset stored in its local database (not shown) to provide an estimation of the likelihood that an anomalous or other event has occurred. In some cases the indication provided by the first level of detection at the RN level may simply be positive (indicating that there may be a potential anomalous or other event) or negative (indicating that the system is operating normally or that no other type of predefined event has occurred). Each detector may monitor for and detect anomalous events that arise at its level in the hierarchy. For instance, the RNEDs 368 may detect hardware anomalies, local network anomalies and air-interface anomalies. Likewise, the SNEDs 314 may detect RN cluster related anomalies and wide area network anomalies, while the CED 335 can be used to detect anomalies that occur across SNs and also to inform the system operator of potential faults and other anomalies and events. In some cases the CED 335 may pass off all the available information concerning the event to an off-line component outside of the gateway such as the management interface 370, for example, which can perform a more fine grain data analysis to confirm the event and, if necessary, identify the specific problem that is causing the event.

In addition to examining patterns of input variables for identifying patterns that match default or other previously obtained patterns, input value patterns may be examined to identify deviations from expected patterns, which may also indicate anomalous behavior.

A user interface may be provided through which the system operator can manage the hierarchical data mining system. Among other things, this interface may be used to establish default patterns and identify anomalous faults. In addition, in some implementations the interface may allow the system operator to tag certain patterns that occur or are expected to occur when there are unusual traffic patterns such as during a concert or sporting event, for example. In this way the system operator can look for such patterns of input values in the future to recognize the occurrence of similar traffic patterns. In some embodiments the interface may be incorporated into the management interface 370.

Instead of, or in addition to, detecting anomalous events, the techniques described herein may be used to obtain other types of information. For example, patterns of input values may be examined to automatically identify or classify the environment in which an RN cluster is deployed. This detection may occur upon initial deployment or it may be a one-time or periodic status update concerning the nature of the environment (and the traffic of that environment) in which the RN cluster is located. For example, environments such as shopping malls, offices, residential areas, and so on, may each have unique patterns that can be used to identify them. In a shopping mall, for instance, the input parameter patterns may be expected to reflect high mobility traffic patterns, with little traffic being generated overnight. Similarly, in a stadium, concert hall, or other venue in which special events are held, the parameter patterns may be expected to show traffic aggregating toward one particular cluster or a particular zone within a cluster (e.g., entrances/exits), suggesting that a special event is beginning or ending.

By way of example, if the learning function that is employed to recognize patterns is a neural network, inferences that are obtained using values of input variables at one level of the hierarchy may be provided to the next higher level to obtain additional inferences at that level. For instance, a vector of input values that are based on measurements obtained at each RN may be used by the RNs to identify patterns at their local level. The result of the inferences made by the RNs may be communicated to their respective SNs, which can then use the inferences and the input value vectors to obtain inference output vectors from which cluster-wide events may be inferred. The results of the inference obtained at the SN level may be in turn passed to a higher level in the hierarchy that can generate inference output vectors to identify events that occur across SNs. For example, if inference output vectors obtained at the SN level are d-SON related inferences, then the inference output vectors obtained at the next higher level may be obtained from an A-SON inference process.

Figure 8:
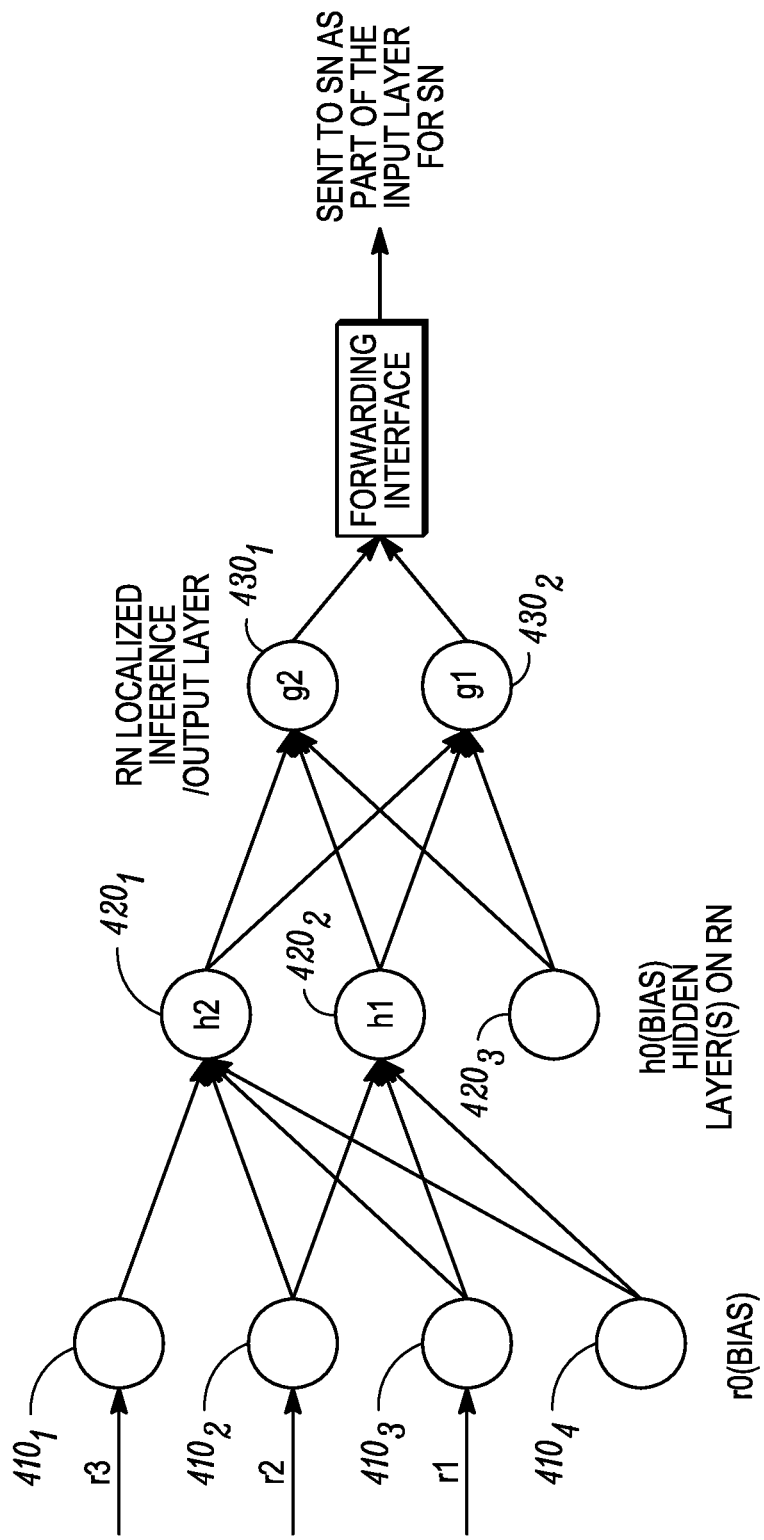
FIG. 8 shows one example of a simplified neural network that may be used in a hierarchical anomaly and other event detector arrangement.

FIG. 8 shows one example of a simplified neural network that may operate at the RN level. The network includes input layer nodes 410$_1$, 410$_2$, 410$_3$ and 410$_4$, hidden layer nodes 420$_1$, 420$_2$ and 420$_3$ and output layer nodes 430$_1$ and 430$_2$. While the illustrative neural network shown in FIG. 8 has 4 input layer nodes, 3 hidden layer nodes and two output layer nodes, more generally any number of nodes may be employed in each layer. Values of input variable $r_0, r_1, r_2, r_3 \ldots r_n$, where $r_0$ is a constant that is to be optimized during a training process and $r_1, r_2, r_3 \ldots r_n$ are values measured by the RN, define a vector of inputs. Computations may be performed by defining functions for the hidden layer nodes that may be a function of the input variables i.e., $h_i = f_1(r_0, r_1, r_2, r_3)$ and by defining functions for the output layer nodes as a function of the hidden layers i.e., $g_i = f_2(h_0, h_1, h_2)$. The functions $f_1, f_2, \ldots, f_n$ used at each layer on the RN may be identical or different. The SN may implement a different or similar learning model. For example, the function $f_1$ could be a linear combination of the input:

$$f_1(r_0, r_1, r_2, r_3) = r_0 + w_1 r_1 + w_2 r_2 + w_3 r_3.$$

The weights $w_1, w_2, \ldots, w_3$ and the bias $r_0$ may be learned through a training phase, which can be obtained, for instance, when the system operator tags an input value pattern of a specific known event. Other parameterized non-linear functions can be used and trained via similar training techniques. For example, one such function may be:

$$f_1(r_0, r_1, r_2, r_3) = \frac{1}{1 + \exp(-r_0 - w_1 r_1 - w_2 r_2 - w_3 r_3)}$$

The use of a hierarchical data mining architecture as described above may allow anomalous events (e.g., faults) to be detected and other types of information to be obtained more quickly than they otherwise would. For instance, whereas a fault may otherwise not be detected until a customer complains, a hierarchical data mining technique may allow it to be detected before a complaint is even received. Moreover, in some cases this technique may avoid the need to send a field technician to the site to identify and repair the problem. For instance, the information obtained from hierarchical data mining may be used to infer, for example, that the fault is not in the RN cluster but rather is caused by a nearby macrocell. As another example, anomalies may be detected in two nearby clusters and data mining may be used to determine that the anomalies are correlated, suggesting that the problem is due to a change in status of a common macrocell seen by both RN clusters. Even if a technician does need to be sent, the information obtain from hierarchical data mining may be used by the technician to locate and correct the fault more quickly.

In addition to detecting faults after they occur, the hierarchical data mining technique described herein may also be used to predict the occurrence of faults by correlating multilevel, and possibly even multi-operator data.

Over-the-Air Diagnostics

If IP connectivity between the core network and/or the access controller and a small cell is lost over the wired management interface, then no diagnostic information is available from the small cell. Typically, this results in an engineer having to visit the site to debug the issue. If a separate communication mechanism were available, then certain issues could be diagnosed. For example, it could be determined that the small cell still had power, and some basic information regarding which stage of the IP connection is broken could be determined.

One way to avoid sending an engineer to the site when it is determined that IP connectivity to the core network and/or access controller has been lost in a small cell RAN that includes small cells A, B, C, etc., is to have the small cell A enter a mode where it listens to the downlink transmissions of nearby small cells B and C. The access controller, upon determining lost IP connectivity to small cell A, requests nearby small cells B and C to begin transmission of a diagnostic signal.

Upon detection of the diagnostic signal, small cell A performs various diagnostic operations such as 'ping' and 'traceroute' and transmits the results over the air at a pre-arranged time instance. Small cell A then returns to the listening mode. Small cells B and C decode the transmission from small cell A at the pre-arranged time instance and send the decoded diagnostic results to the access controller. The controller, or an engineer, uses this information to diagnose the IP connectivity issue, potentially avoiding a visit to the customer site.

In an alternative embodiment, instead of small cell A transmitting to other small cells over a proprietary interface, small cell A could act as a UE client and connect to either other small cells B or C, or a macro cell using standard wireless protocols (e.g., LTE or UMTS). This approach has the benefit of using standard interfaces and makes it easier to connect to the macro cell. However, one potential drawback of this approach is that it requires significant additional complexity in order to implement UE client-side protocols. For instance, the small cell may require a SIM card may need to be able to transmit on uplink frequencies (for an FDD system).

Backhaul Traffic Compression

Small cell RANs of the type described above can dramatically improve the coverage in and capacity of mobile wireless communication systems. The large number of small cell RNs that are to be deployed to achieve these gains, however, also presents significant challenges. One challenge pertains to the significantly increased capacity of the "backhaul" links that would be required to connect the small cell RNs with the carrier's core network, making the backhaul a bottleneck.

In accordance with various embodiments of the systems and techniques described herein, methods based on compression of the backhaul data traffic are presented. These methods are described in the context of a scalable small cell system based on a virtualized gateway of the type described above.

As discussed above, each RN cluster may include upwards of several hundreds of RNs, with each RN serving several tens of UEs in a connected state at a given time. Consequently, the backhaul link carrying traffic between a RN cluster and the SN serving the RN cluster in the cloud potentially becomes a bottleneck. Similarly, the backhaul link between an SN and the CN aggregator and mobility anchor module 330 is another potential bottleneck. Reducing the load on each of these backhaul links can therefore enhance system performance. It should be noted in a traditional LTE network architecture, the packet core communicates directly with an RN since there is no use of services node or a RN cluster. As a consequence the backhaul bottleneck considered in the present circumstances is markedly distinct from issues that are faced in traditional architectures.

The basic premise behind compression-based approaches is to reduce the amount of traffic on the backhaul links by removing any redundancy in the traffic carried over the backhaul. Specifically, the traffic being exchanged between the end points (UEs, and the EPC) potentially may carry redundant information, which need not be repetitively transmitted over the backhaul links. Several illustrative methods for reducing this redundant information will be presented below.

Figure 9:
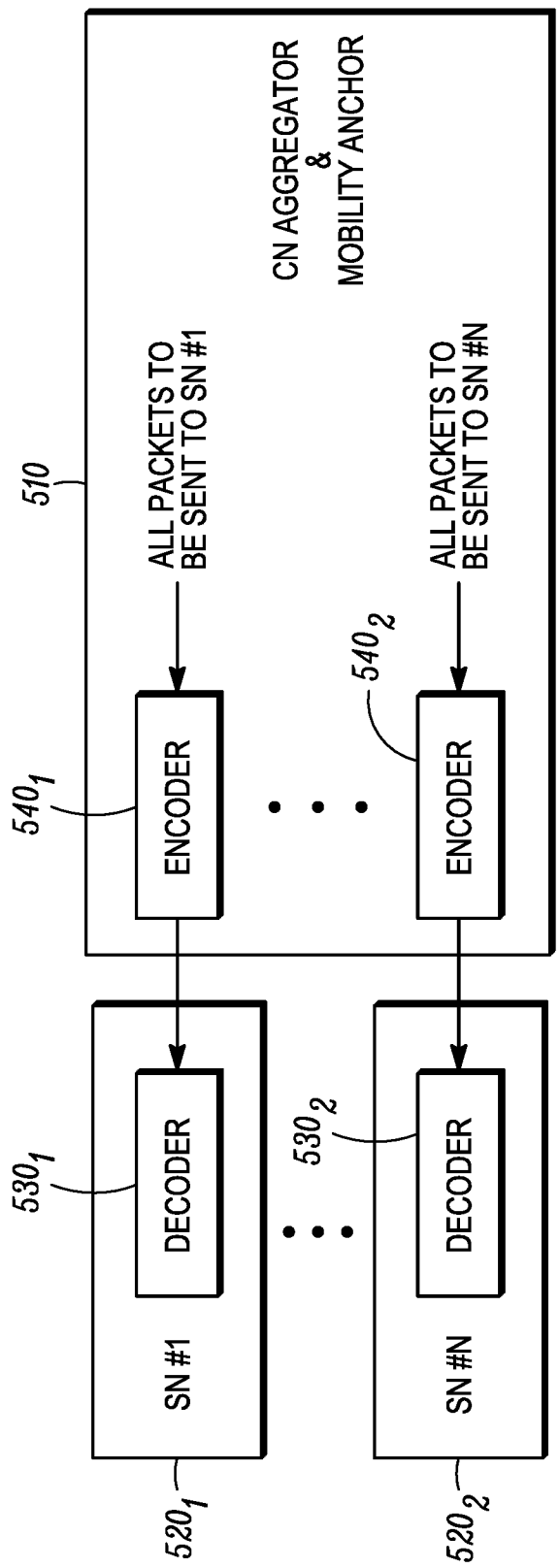
FIG. 9 illustrates one example of a compression technique that may be employed within a gateway between the access controller modules (e.g., services nodes) and the CN aggregator and mobility anchor.

First, consider the downlink transmission, from the EPC to the UEs. The data from the EPC to the CN aggregator and mobility anchor module 330 consists of packets destined for different UEs across all the N RN clusters. The CN aggregator and mobility anchor module 330 forwards these packets to the different SNs, depending on the topology information available from the configuration and topology database. At a fundamental level, removal of the redundancy in the information that the CN aggregator passes on to an SN, can be understood by considering a compression/encoding operation E (performed at the CN aggregator and mobility anchor module 330 before transmission) on the contents of the different packets that need to be passed on, and a decompression/decoding operation (D) performed at the SN on the data received by the SN from the aggregator. These operations are depicted in FIG. 9, which shows the CN aggregator module 510 and two SN instances $520_1$ and $520_2$ of a gateway. The CN aggregator module 510 includes encoders $540_1$ and $540_2$, which respectively communicate with decoders $530_1$ and $530_2$ in the SNs $520_1$ and $520_2$.

In FIG. 9, each encoder 540 takes as input the contents of the packets to be transported from the CN aggregator and mobility anchor module 510 to a particular SN, removes the redundancies, and outputs a compressed version of the input. The compressed data is then transmitted to the SN. The decoder 520 associated with the SN takes the compressed data as input and decompresses it to obtain the original uncompressed data. Note that, as depicted in FIG. 9, such an encoder-decoder pair may be employed for each transmission to each SN.

In one particular embodiment of this invention, compression is performed on the header information contained in the different packets to be transported from the CN aggregator and mobility anchor module to an SN. Compression of the header can achieve significant bandwidth savings, especially for small packets such as voice packets, ACK message packets, etc. Compression of the header is typically performed by exploiting temporal correlations: Consecutive packets to be sent to the same UE contain header information that does not vary significantly. This enables use of a differential encoding operation on the packet headers, wherein information that does not rapidly change need not be transmitted again. While this may be already done in practice to some extent, in this embodiment, headers of packets intended for different UEs may be compressed. Specifically, some of the information contained in the packet headers for different UEs may contain similar information. For instance, certain header fields which specify information such as protocol version, header length, type of service, source address, destination address, source port, destination port, and so on, could be encoded differentially across the packets to be sent to different UEs.

In another embodiment, compression may be employed when transmitting packets corresponding to multicast and broadcast services. These packets are provided by the EPC to the CN aggregator and mobility anchor module for further delivery to UEs that are currently receiving multicast/broadcast traffic. In this embodiment even though several UEs connected to an SN may be receiving multicast/broadcast traffic, the CN aggregator and mobility anchor module 330 transmits only one instance of the multicast/broadcast packets to the SN, as opposed to say, generating multiple UE-specific packets containing the same broadcast data and transmitting all of them separately to the SN.

Figure 10:
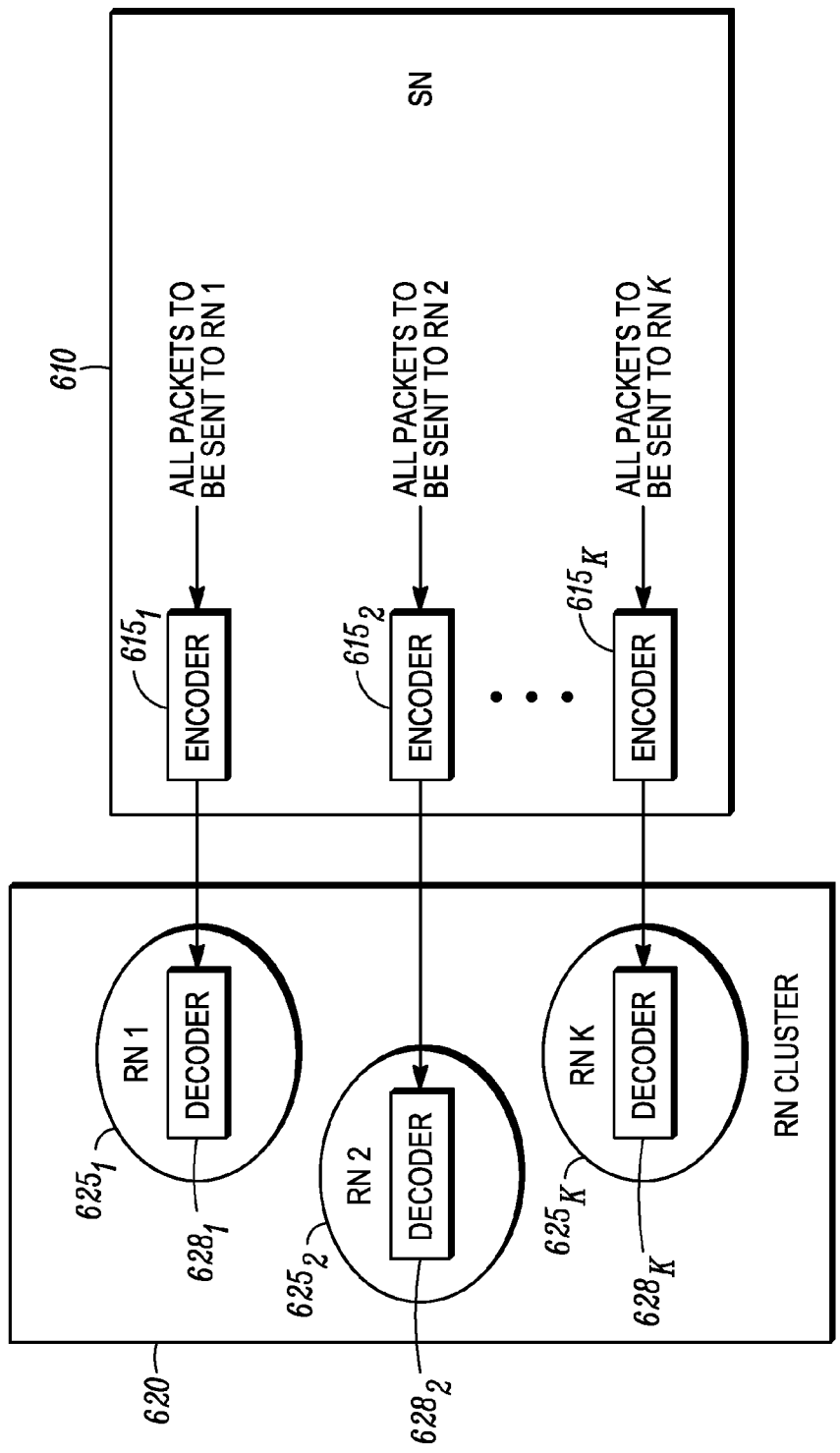
FIG. 10 illustrates one example of a compression technique that may be employed between one of the access controller modules (e.g., services nodes) in the gateway and the radio node (RN) clusters.

In yet another embodiment, compression is applied to the backhaul link between an SN and a RN cluster. Although physically this link may be one physical connection, at a logical level it can be represented as consisting of independent connections from an SN to the different RNs within a cluster, as shown in FIG. 10 for communication between SN 610 and RN cluster 620. More specifically, FIG. 10 shows SN 610 as including encoders $615_1$, $615_2$ . . . $615_k$ that respectively send compressed packets to decoders $628_1$, $628_2$ . . . $628_k$ in RNs $625_1$, $625_2$ . . . $625_k$.

The backhaul link shown in FIG. 10 carries all the packets intended for each RN separately, as the different RNs must be provided with all the packets to be transmitted further to the UEs. Consequently, in the case of multicast/broadcast traffic, the SN needs to transmit the broadcast/multicast packets separately to each desired RN in the cluster. On the other hand, compression of the packet header information, discussed in a preceding embodiment, may still be applied. For instance, for all the packets to be sent to a particular radio node, joint compression/encoding of the header data may be performed at the SN, with a decoding operation performed at the radio node.

Figure 11:
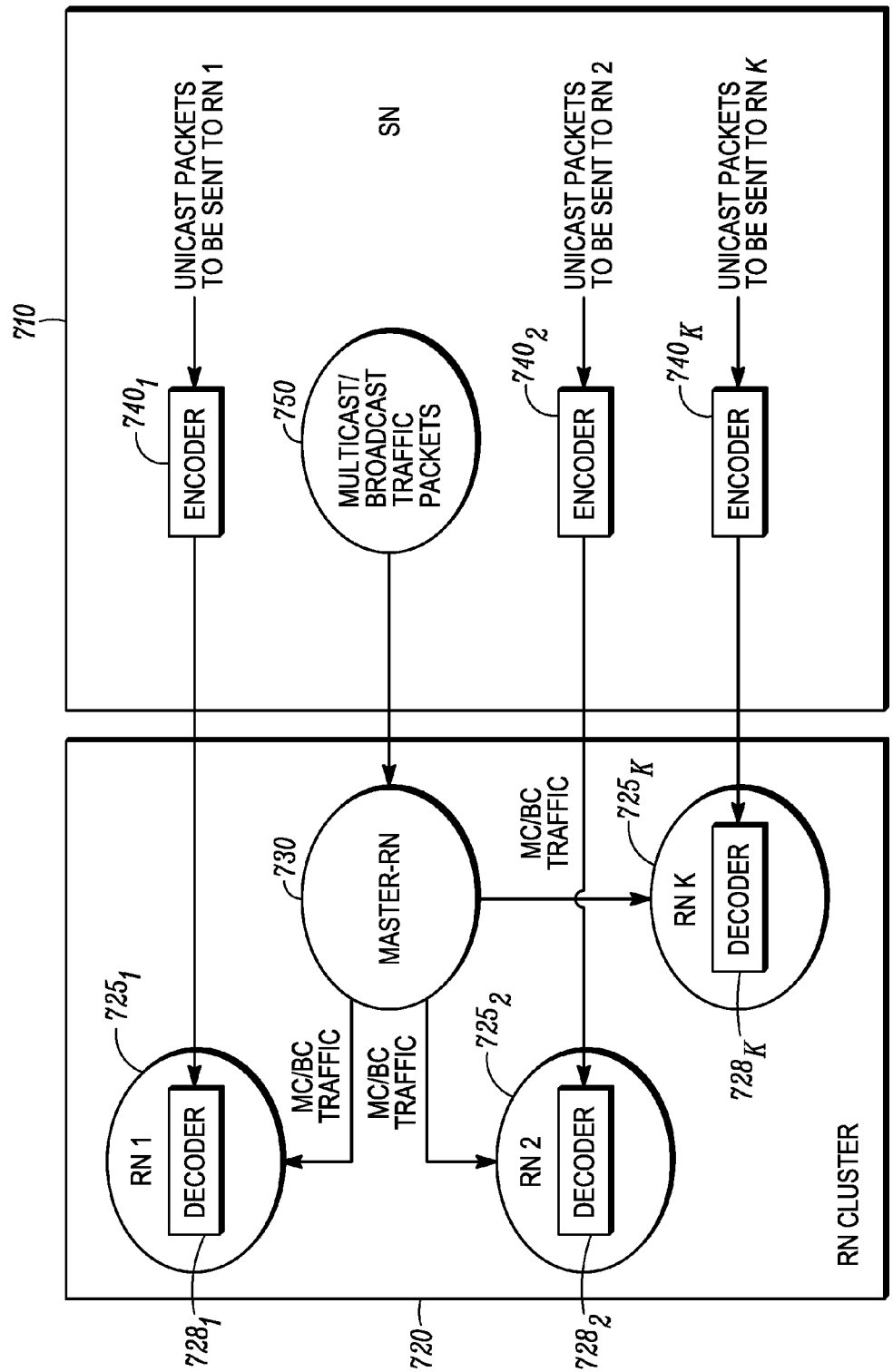
FIG. 11 illustrates another example of a compression technique that may be employed between one of the access controller modules (e.g., services nodes) in the gateway and the radio node (RN) clusters.

In yet another embodiment illustrated in FIG. 11, a master radio node (M-RN) 730 may be designated in each cluster 720, which would generally be located at the enterprise. The M-RN 730 can communicate with the different radio nodes $725_1$, $725_2$ . . . $725_k$ in its cluster. Further, the M-RN 730 can communicates with the SN 710 as well, just like any other RN in the cluster. In this topology, since the M-RN 730 can further communicate with the other RNs, further compression may be performed by encoders $740_1$, $740_2$ . . . $740_k$ on the SN to RN cluster backhaul link. Specifically, any multicast/broadcast traffic packets that are to be delivered only needs to be transmitted once, from the SN 710 to the M-RN 730, along with information specifying the RNs to which these packets must be forwarded. The M-RN 730 may then forward these packets to the desired radio nodes.

While the previous embodiments have discussed compression in the context of downlink transmission, some of these embodiments are also applicable to uplink transmissions (i.e., from the UE to the core network) as well. For instance, an SN needs to forward packets from different UEs to the CN aggregator and mobility anchor module. As in a preceding embodiment, joint compression could be performed on the headers of different packets to reduce the total traffic on the link between the SN and the CN aggregator and mobility anchor module 330.

In another embodiment in which uplink data compression is employed, compression may be performed on the payloads (i.e., the actual "data", or in other words, the non-header portion of the packet) in the different packets. This could correspond to various types of payload data, e.g., voice, video, images, text, etc. In many scenarios, it is plausible that the data being transmitted by different UEs could be correlated. For instance, at a sports or concert venue, many users could potentially be transmitting correlated live video streams. Such correlations can be exploited to reduce the total amount of data to be transmitted across the backhaul links. For instance, the data received from the different UEs connected to the same RN could be analyzed for potential correlations at the SN, and these correlations could be exploited to compress the data before transmission to the CN aggregator and mobility anchor module. A decoder/decompressor associated with the CN aggregator and mobility anchor module can decompress this data. In those embodiments in which compression in performed both on uplink and downlink traffic, the encoders and decoders shown in FIGS. 9-11 each may be replaced a suitable encoder/decoder.

Several aspects of telecommunication systems will now be presented with reference to gateway described in the foregoing detailed description and illustrated in the accompanying drawing by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system. By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionalities described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a non-transitory computer-readable media. Non-transitory computer-readable media may include, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable media for storing software. The non-transitory computer-readable media may be resident in the processing system, external to the processing system, or distributed across multiple entities including the processing system. Non-transitory computer-readable media may be embodied in a computer-program product. By way of example, a computer-program product may include one or more computer-readable media in packaging materials.

Those skilled in the art will recognize how best to implement the described functionality presented throughout this disclosure depending on the particular application and the overall design constraints imposed on the overall system.

The invention claimed is:

1. A method of coordinating a plurality of radio access networks (RANs), comprising:
aggregating, with a gateway comprising a plurality of access controller modules, communications interfaces between a plurality of RANs and a packet core network through the gateway, a plurality of radio nodes (RNs) in each of the plurality of RANs communicatively coupled to the gateway and to user equipment (UE) devices associated with the plurality of RNs in each of the plurality of RANs;
controlling and coordinating, with the gateway, mobility of the UE devices within and among the RANs; and
assigning each of the plurality of RANs to a single one of the plurality of access controller modules so that each access controller module controls a respective RAN to which it is assigned.

2. The method of claim 1, further comprising:
receiving a join request from a RN and/or a RAN; and
authenticating, with a cluster manager included in the gateway, the RN and/or the RAN that sends the join request.

3. The method of claim 1, further comprising:
receiving a join request from the plurality of RNs;
authenticating, with a cluster manager included in the gateway, the plurality of RNs that sends the join request; and
selecting, with the cluster manager, which access controller module each of the plurality of RNs is to be assigned.

4. The method of claim 3, wherein selecting which access controller module each of the plurality of RNs is to be assigned is based at least in part on a signature of the plurality of RNs and a current load of the plurality of access controller modules.

5. The method of claim 4, wherein the signature includes a geographic location of the plurality of RNs.

6. The method of claim 5, wherein the geographic location of the plurality of RNs is specified by a location identifier selected from the group consisting of a Global Positioning System (GPS) coordinate, physical address, radio frequency (RF) topology and Internet Protocol (IP) address.

7. The method of claim 1, further comprising redirecting, with a cluster manager, one of the plurality of RANs from a first access controller module to a second access controller module in the event of a failure associated with the first access controller module or for the purposes of load balancing.

8. The method of claim 1, further comprising launching, with a cluster manager, a new access controller module to perform load balancing based at least in part on a current load of remaining ones of the plurality of access controller modules.

9. The method of claim 8, further comprising:
launching the new access controller module in response to receiving a join request from a RN and/or a RAN; and
assigning the RN and/or the RAN from which the join request was received to the new access controller module.

10. The method of claim 1, further comprising at least one access controller module located external to the gateway.

11. The method of claim 1, wherein each of the plurality of access controller modules includes a distributed self-organizing network (SON) (d-SON) module for provisioning RNs assigned to the respective plurality of access controller modules in accordance with self-configuration, self-optimization and self-healing (SON) functionality.

12. The method of claim 11, further comprising coordinating, with an aggregated SON (A-SON) module, activity performed by each d-SON module in each of the plurality of access controller modules.

13. The method of claim 12, further comprising assigning, with a cluster manager operating in coordination with the A-SON module, a newly added RN to one of the plurality of RANs.

14. The method of claim 12, wherein coordinating the activity performed by each d-SON module includes determining that two or more selected d-SON modules can conduct SON functionality simultaneously with one another.

15. The method of claim 12, further comprising, with the A-SON module, allocating physical cell identifiers (PCIs) and/or primary scrambling codes (PSCs) across RANs assigned to different ones of the plurality of access controller modules.

16. The method of claim 1, further comprising conducting handover events between RNs associated with a same access controller module or different access controller modules without signaling the packet core network.

17. The method of claim 16, further comprising responding, with the gateway, to a Radio Resource Control (RRC) connection reestablishment request by performing an RRC Reestablishment Procedure across RNs from a same RAN or different RANs.

18. The method of claim 1, wherein the plurality of access controller modules and a hardware platform hosting the plurality of access controller modules has a Network Function Virtualization (NFV) architecture.

19. The method of claim 1, further comprising using a single interface for all communication between the plurality of access controller modules and the packet core network.

20. The method of claim 19, wherein the single interface is provided by a mobility anchor module at which all data plane traffic between the UE devices and the packet core network terminate.

21. The method of claim 19, wherein the single interface is included in a core network (CN) aggregator module and further comprising:
receiving at the gateway user traffic destined for one of the plurality of RNs;
determining that selected content in the user traffic is likely to be requested by one or more of the UE devices on multiple occasions from a destination RN; and
causing the selected content to be cached at the CN aggregator module, the access controller module that controls and coordinates the destination RN, or the destination RN.

22. The method of claim 21, wherein a first set of selected content items that are more likely to be requested on multiple occasions are cached at the destination RN, and a second set of selected content items that are less likely to be requested on multiple occasions than the first set of selected content items are stored at the access controller module, instance and a third set of selected content items that are less likely to be requested on multiple occasions than the second set of content items are cached at the CN aggregator module.

23. The method of claim 19, wherein the single interface is included in a core network (CN) aggregator module and further comprising compressing, at the CN aggregator module, data packets in downstream user traffic destined for a common access controller module of the plurality of access controller modules.

24. The method of claim 23, wherein compressing the data packets includes compressing packet header information in at least some of the data packets.

25. The method of claim 24, wherein compressing the packet header information is based at least in part on exploiting temporal correlations among consecutive ones of the data packets, the compressing including a differential encoding operation performed on data packets destined for a same UE device or different ones of the UE devices.

26. The method of claim 23, further comprising decompressing the data packets at the common access controller module.

27. The method of claim 19, wherein the single interface is included in a core network (CN) aggregator module and further comprising compressing, at one of the plurality of access controller modules, data packets in upstream user traffic to be forwarded to the CN aggregator module, wherein compressing the data packets includes jointly compressing and encoding at least some of the data packets.

28. The method of claim 27, wherein compressing the data packets in the upstream user traffic includes compressing payload data in the data packets of the upstream user traffic, wherein the payload data in some of the data packets being compressed is correlated with the payload data in others of the data packets being compressed.

29. The method of claim 1, further comprising aggregating, with the gateway, the communications interfaces between at least two of the plurality of RANs that operate in accordance with different protocols.

30. The method of claim 29, wherein one of the at least two of the plurality of RANs operates in accordance with a Long Term Evolution (LTE) standard and the other of the at least two of the plurality of RANs operates in accordance with a Universal Mobile Telecommunications Systems (UTMS) standard.

31. The method of claim 1, further comprising reducing call setup times by combining a plurality of control plane messages between one of the plurality of RNs and a service node (SN) instance to which the one of the plurality of RNs is respectively assigned.

32. The method of claim 1, wherein each of the plurality of access controller modules performs logical open systems interconnection (OSI) layer L3 processing.

33. The method of claim 32, wherein each of the plurality of access controller modules performs at least a portion of logical open systems interconnection (OSI) layer L2 processing.

34. The method of claim 33, wherein the OSI layer L2 processing performed by each of the plurality of access controller modules includes Packet Data Control Protocol (PDCP) processing.

35. The method of claim 1, further comprising:
receiving at the gateway user traffic destined for one of the plurality of RNs;
determining that selected content in the user traffic is likely to be requested by one or more of the UE devices on multiple occasions from a destination RN; and
causing the selected content to be cached at the gateway or at the destination RN.

36. The method of claim 35, wherein a first set of selected content items that are more likely to be requested on multiple occasions are cached at the destination RN and a second set of selected content items that are less likely to be requested on multiple occasions than the first set of selected content items are stored at the gateway.

37. The method of claim 35, wherein determining that the selected content in the user traffic is likely to be requested by one or more of the UE devices on multiple occasions from the destination RN is based at least in part on historical information concerning content that has been previously retrieved on multiple occasions.

38. The method of claim 35, wherein determining that the selected content in the user traffic is likely to be requested by one or more of the UE devices on multiple occasions from the destination RN is based at least in part on a date, day, and/or time of day that the selected content is received.

39. The method of claim 35, wherein determining that the selected content in the user traffic is likely to be requested by one or more of the UE devices on multiple occasions from the destination RN is based at least in part on a geographic location of the destination RN.

40. The method of claim 35, wherein determining that the selected content in the user traffic is likely to be requested by one or more of the UE devices on multiple occasions from the destination RN is based at least in part on a content type.

41. The method of claim 35, wherein how likely the selected content is to be requested on multiple occasions is based on how frequently the selected content is likely to be requested over a prescribed period of time.

42. The method of claim 35, wherein how likely the selected content is to be requested on multiple occasions is based on a total number of times that the selected content is likely to be requested over a prescribed period of time.

43. The method of claim 1, further comprising causing at least some user traffic to avoid traversing the packet core network in accordance with Local IP Access (LIPA) and/or Selected Internet IP Traffic Offload (SIPTO) techniques.

44. The method of claim 43, wherein a core network (CN) aggregator module includes a Local Gateway (L-GW) for implementing the LIPA techniques.

45. The method of claim 1, further comprising:
receiving at the gateway user traffic destined for one of the plurality of RNs;
determining that selected content in the user traffic is to be cached at the gateway or at a destination RN; and
causing the selected content to be cached at the gateway or at the destination RN.

46. The method of claim 45, wherein the selected content is cached in accordance with an agreement with a content provider of the selected content.

47. The method of claim 46, further comprising providing the content provider with information concerning the user traffic that is used at least in part to determine the selected content that is to be cached.

48. The method of claim 46, wherein the agreement is arranged in an auction process.

49. The method of claim 46, wherein the agreement includes a tiered pricing scheme in which a cost for caching the selected content increases as a response time from a cache resource that is caching the selected content to a UE device that is to receive the selected content decreases.

50. The method of claim 1, further comprising:
receiving at the gateway over a control plane input data from the plurality of RNs, the input data specifying values for input variables that reflect operating conditions of the plurality of RNs;
identifying one or more patterns arising in the values of the input variables; and
based at least in part on the one or more patterns that are identified, generating an output indicator identifying an environment in which a cluster of the plurality of RNs is located or indicating that a potential anomalous or other event has occurred.

51. The method of claim 50, wherein the input data is received only from one or more of the plurality of RNs that have evaluated the input data and determined that an anomalous or other event is likely to have occurred with a probably greater than a threshold value.

52. The method of claim 50, wherein the potential anomalous or other event is an event that occurs across multiple RNs in a cluster of RNs.

53. The method of claim 50, wherein the input data includes key performance indicator (KPI) data.

54. The method of claim 50, wherein the input data is a type of data selected from the group consisting of radio frequency (RF) signatures, channel quality indicator (CQI) feedback, and primary scrambling code (PSC) reports.

55. The method of claim 50, further comprising comparing the one or more patterns to predefined patterns, wherein generating the output indicator includes generating the output indicator when the one or more patterns match at least one of the predefined patterns to within a prescribed degree.

56. The method of claim 50, further comprising comparing the one or more patterns to predefined patterns, wherein generating the output indicator includes generating the output indicator when the one or more patterns deviates from at least one of the predefined patterns by more than a prescribed amount.

57. The method of claim 50, wherein identifying the one or more patterns includes identifying the one or more patterns using a learning function.

58. The method of claim 57, wherein the learning function is selected from the group consisting of logical regression functions, artificial/convoluted neural networks, and k-mean clustering.

59. The method of claim 50, wherein the output indicator identifying the environment is received by the gateway in a periodic status update.

60. The method of claim 50, wherein the gateway includes a plurality of access controller modules that each coordinate and control a plurality of RNs that define an RN cluster, wherein identifying the one or more patterns arising in the values of the input variables is performed by an access controller module that controls and coordinates the plurality of RNs from which values of the input variables are received.

61. The method of claim 60, further comprising providing the values of the input variables to a centralized gateway module that communicates with each of the plurality of access controller modules, the centralized gateway module generating a second output indicator indicating that a potential anomalous or other event has occurred across different ones of the plurality of access controller modules.

62. The method of claim 61, further comprising providing the output indicator and the second output indicator from one or more of the plurality of access controller modules to the centralized gateway module.

63. The method of claim 1, further comprising:
    determining, with one of the plurality of access controller modules controlling a first RAN of the plurality of RANs in which a first RN of the plurality of RNs is located, that IP connectivity to the first RN has been lost; and
    causing at least a second RN of the plurality of RNs to transmit an over-the-air diagnostic signal to the first RN and, in response thereto, receiving a diagnostic results signal from the second RN, the diagnostic results signal including diagnostic results from the first RN.

64. The method of claim 1, further comprising:
    examining, at the gateway, data packets in downstream user traffic destined for UE devices attached to a given RN of the plurality of RNs for reducing redundancies among the data packets;
    compressing, at the gateway, at least some of the data packets to remove at least some of the redundancies; and
    transmitting the data packets to the given RN.

65. The method of claim 64, wherein compressing at least some of the data packets includes compressing packet header information in at least some of the data packets.

66. The method of claim 64, wherein compressing at least some of the data packets includes jointly compressing and encoding at least some of the data packets.

67. The method of claim 1, wherein a cluster of RNs includes a master RN that communicates with every other RN in the cluster and further comprising:
    examining multicast/broadcast data packets in downstream user traffic to identify, with the gateway, data packets that are destined for the RNs in the cluster; and
    transmitting the identified data packets only to the master RN along with information specifying the RNs in the cluster to which the identified data packets are to be forwarded by the master RN.

68. The method of claim 1, further comprising:
    examining, at a first access controller module of the plurality of access controller modules, data packets in downstream user traffic destined for UE devices attached to a given RN of the plurality of RNs assigned to the first access controller module for reducing redundancies among the data packets;
    compressing, at the first access controller module, at least some of the data packets to remove at least some of the redundancies; and
    transmitting the data packets to the given RN.

69. A method of coordinating a plurality of radio access networks (RANs), comprising:
    aggregating, with a gateway comprising a plurality of access controller modules, communications interfaces between a plurality of RANs and a packet core network through the gateway, a plurality of radio nodes (RNs) in each of the plurality of RANs communicatively coupled to the gateway and to user equipment (UE) devices associated with the plurality of RNs in each of the plurality of RANs;
    controlling and coordinating, with the gateway, mobility of the UE devices within and among the plurality of RANs; and
    conducting a hand-in or hand-out event between a macro cell and one of the plurality of access controller modules without signaling the packet core network.

70. A gateway through which a plurality of radio access networks (RANs) communicate with a packet core network, comprising:
    a plurality of access controller modules to which as least one RAN is assigned, each of the plurality of access controller modules being configured to control the at least one RAN assigned thereto;
    a core network (CN) aggregator module configured as a single interface for all communication between the plurality of access controller modules and the packet core network;

a mobility anchor module at which all data plane traffic between user equipment (UE) devices attached to one of the plurality of RANs and the packet core network terminate; and a cluster manager module for assigning radio nodes (RNs) to the plurality of access controller modules and transferring RN assignments from one access controller module to a different access controller module under specified circumstances.

71. The gateway of claim 70, wherein each of the plurality of access controller modules further includes an event detector configured to monitor for and detect anomalous and other events that occur across different ones of the RNs, the detecting being based at least in part on input data received by the plurality of access controller modules from the respective RNs that they control and coordinate, the input data specifying values for input variables that reflect operating conditions of the RNs.

72. The gateway of claim 71, wherein the event detector is further configured to receive from one or more of the RNs that it respectively controls and coordinates an indication that an anomalous or other event has potentially occurred.

73. The gateway of claim 71, further comprising a centralized gateway module configured to receive the input data from the plurality of access controller modules and to monitor for and detect anomalous and other events that occur across different ones of the plurality of access controller modules.

74. The gateway of claim 73, wherein the centralized gateway module is further configured to receive from one or more of the plurality of access controller modules an indication that an anomalous or other event has potentially occurred.

75. The gateway of claim 70, wherein at least one access controller module of the plurality of access controller modules controlling a first RAN of the plurality of RANs in which a first RN of the plurality of RNs is located is configured such that when IP connectivity to the first RN has been lost the at least one access controller module causes at least a second RN of the plurality of RNs to transmit an over-the-air diagnostic signal to the first RN and, in response thereto, receive a diagnostic results signal from the second RN, the diagnostic results signal including diagnostic results from the first RN.

76. The gateway of claim 70, wherein the CN aggregator module includes an encoder for compressing data packets in downstream user traffic destined for a common access controller module of the plurality of access controller modules and the common access controller module includes a decoder for decompressing the compressed data packets.

77. The gateway of claim 76, wherein the encoder is configured to compress packet header information in at least some of the data packets based at least in part on temporal correlations among consecutive ones of the data packets.

78. The gateway of claim 70, wherein at least one of the plurality of access controller modules includes an encoder for compressing data packets in upstream user traffic to remove redundancies therein and the CN aggregator module includes a decoder for decompressing the data packets.

79. A method of coordinating a plurality of radio access networks (RANs), comprising:

aggregating, with a gateway comprising a plurality of access controller modules, communications interfaces between a plurality of RANs and a packet core network through the gateway, a plurality of radio nodes (RNs) in each of the plurality of RANs communicatively coupled to the gateway and to user equipment (UE) devices associated with the plurality of RNs in each of the plurality of RANs;

controlling and coordinating, with the gateway, mobility of the UE devices within and among the plurality of RANs;

determining, with the gateway, that IP connectivity to a first RN of the plurality of RNs over a wired management interface has been lost; and causing at least a second one RN of the plurality of RNs to transmit an over-the-air diagnostic signal to the first RN and, in response thereto, receiving a diagnostic results signal from the second RN, the diagnostic results signal including diagnostic results from the first RN.

80. A method of coordinating a plurality of radio access networks (RANs), comprising:

aggregating, with a gateway comprising a plurality of access controller modules, communications interfaces between a plurality of RANs and a packet core network through the gateway, a plurality of radio nodes (RNs) in each of the plurality of RANs communicatively coupled to the gateway and to user equipment (UE) devices associated with the plurality of RNs in each of the plurality of RANs;

controlling and coordinating, with the gateway, mobility of the UE devices within and among the plurality of RANs;

determining, with the gateway, that IP connectivity to a first RN of the plurality of RNs has been lost; and causing the first RN to transmit to the gateway a wireless diagnostic results signal conforming to UE transmission protocols, the diagnostic results signal including diagnostic results from the first RN.

* * * * *

UNITED STATES PATENT AND TRADEMARK OFFICE
CERTIFICATE OF CORRECTION

PATENT NO. : 10,349,313 B2  
APPLICATION NO. : 15/081311  
DATED : July 9, 2019  
INVENTOR(S) : Tsung-Yi Chen et al.

Page 1 of 1

It is certified that error appears in the above-identified patent and that said Letters Patent is hereby corrected as shown below:

In the Claims

In Column 23, Line 46, Claim 6, delete "topology" and insert -- topology, --, therefor.

In Column 24, Line 58, Claim 22, after "RN," delete "and".

In Column 24, Line 62, Claim 22, before "and a" delete "instance".

In Column 28, Line 60, Claim 70, delete "as" and insert -- at --, therefor.

Signed and Sealed this
Fifth Day of October, 2021

Drew Hirshfeld
*Performing the Functions and Duties of the
Under Secretary of Commerce for Intellectual Property and
Director of the United States Patent and Trademark Office*